(12) United States Patent
Koito et al.

(10) Patent No.: US 12,174,493 B2
(45) Date of Patent: Dec. 24, 2024

(54) LIQUID CRYSTAL LIGHT CONTROL DEVICE

(71) Applicant: Japan Display Inc., Tokyo (JP)

(72) Inventors: Takeo Koito, Tokyo (JP); Tae Kurokawa, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/370,035

(22) Filed: Sep. 19, 2023

(65) Prior Publication Data

US 2024/0004243 A1  Jan. 4, 2024

Related U.S. Application Data

(63) Continuation of application No. PCT/JP2022/013099, filed on Mar. 22, 2022.

(30) Foreign Application Priority Data

Mar. 31, 2021 (JP) ................. 2021-061437

(51) Int. Cl.
*G02F 1/1343* (2006.01)
*G02F 1/1347* (2006.01)

(52) U.S. Cl.
CPC ...... *G02F 1/134309* (2013.01); *G02F 1/1347* (2013.01)

(58) Field of Classification Search
CPC ............. G02F 1/1337; G02F 1/134309; G02F 1/1347; G02F 1/29; G02F 1/292; G02F 2201/124
See application file for complete search history.

(56) References Cited

U.S. PATENT DOCUMENTS 10,126,607 B2  11/2018  Presniakov et al.
2010/0149444 A1  6/2010  Hikmet et al.
(Continued)

FOREIGN PATENT DOCUMENTS

JP  H07-318959 A  12/1995
JP  2010-525388 A  7/2010
(Continued)

OTHER PUBLICATIONS

International Search Report issued in International Patent Application No. PCT/JP2022/013099 on Jun. 14, 2022 and English translation of same. 5 pages.
(Continued)

*Primary Examiner* — Dung T Nguyen
*Assistant Examiner* — David Y Chung
(74) *Attorney, Agent, or Firm* — K&L Gates LLP

(57) ABSTRACT

A liquid crystal light control device in an embodiment according to the present invention includes a first liquid crystal cell, and a second liquid crystal cell overlapping the first liquid crystal cell. Each of the first liquid crystal cell and the second liquid crystal cell includes a first substrate arranged with a first electrode having a strip pattern, a second substrate arranged with a second electrode having a strip pattern, and a liquid crystal layer between the first substrate and the second substrate. A longitudinal direction of the strip pattern of the first electrode and a longitudinal direction of the strip pattern of the second electrode are arranged to intersect at an angle in the range of 45 degrees±10 degrees.

4 Claims, 20 Drawing Sheets

(56) References Cited

U.S. PATENT DOCUMENTS

| | | |
|---|---|---|
| 2011/0261268 A1 | 10/2011 | Nakai et al. |
| 2018/0196318 A1* | 7/2018 | Presniakov ....... G02F 1/134363 |
| 2022/0128869 A1 | 4/2022 | Tanaka et al. |

FOREIGN PATENT DOCUMENTS

| | | |
|---|---|---|
| JP | 2011-076107 A | 4/2011 |
| JP | 2022-070474 A | 5/2022 |

OTHER PUBLICATIONS

Written Opinion issued in International Patent Application No. PCT/JP2022/013099 on Jun. 14, 2022. 6 pages.

English translation of Japanese Office Action issued in related Japanese Patent Application No. 2023-511008, dated Apr. 23, 2024. 6 pages.

\* cited by examiner

LIQUID CRYSTAL LIGHT CONTROL DEVICE

CROSS-REFERENCE TO RELATED APPLICATIONS

This application is a Continuation of International Patent Application No. PCT/JP2022/013099, filed on Mar. 22, 2022, which claims the benefit of priority to Japanese Patent Application No. 2021-061437, filed on Mar. 31, 2021, the entire contents of which are incorporated herein by reference.

FIELD

An embodiment of the present invention relates to a device that controls the light distribution of light emitted from a light source using the electrooptical effect of liquid crystals.

BACKGROUND

There are known technologies for controlling light distribution of light emitted from a light source using liquid crystal cells. For example, a technique that controls the light distribution of light emitted from a light source by overlapping a plurality of liquid crystal cells is disclosed (for example, refer to US2018/0196318, U.S. Pat. No. 10,126,607).

SUMMARY

A liquid crystal light control device in an embodiment according to the present invention includes a first liquid crystal cell, and a second liquid crystal cell overlapping the first liquid crystal cell. Each of the first liquid crystal cell and the second liquid crystal cell includes a first substrate arranged with a first electrode having a strip pattern, a second substrate arranged with a second electrode having a strip pattern, and a liquid crystal layer between the first substrate and the second substrate. A longitudinal direction of the strip pattern of the first electrode and a longitudinal direction of the strip pattern of the second electrode are arranged to intersect at an angle in a range of 45 degrees±10 degrees.

A liquid crystal light control device in an embodiment according to the present invention includes a first liquid crystal cell, a second liquid crystal cell overlapping the first liquid crystal cell, a third liquid crystal cell overlapping the second liquid crystal cell, and a fourth liquid crystal cell overlapping the third liquid crystal cell. Each of the first liquid crystal cell, the second liquid crystal cell, the third liquid crystal cell, and the fourth liquid crystal cell includes a first substrate arranged with a first electrode having a strip pattern, a second substrate arranged with a second electrode having a strip pattern, and a liquid crystal layer between the first substrate and the second substrate. A longitudinal direction of the strip pattern of the first electrode and a longitudinal direction of the strip pattern of the second electrode are arranged to intersect at an angle in a range of 45 degrees±10 degrees.

A liquid crystal light control device in an embodiment according to the present invention includes a first liquid crystal cell, a second liquid crystal cell overlapping the first liquid crystal cell, a third liquid crystal cell overlapping the second liquid crystal cell, and a fourth liquid crystal cell overlapping the third liquid crystal cell. Each of the first liquid crystal cell, the second liquid crystal cell, the third liquid crystal cell, and the fourth liquid crystal cell includes a first substrate arranged with a first electrode having a strip pattern, a second substrate arranged with a second electrode having a strip pattern, and a liquid crystal layer between the first substrate and the second substrate. A longitudinal direction of the strip pattern of the first electrode and a longitudinal direction of the strip pattern of the second electrode are arranged to intersect at an angle in a range of 67.5 degrees±10 degrees.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

The term "optical rotation" as used herein refers to a phenomenon in which a linearly polarized component rotates its polarization axis as it passes through the liquid crystal layer.

The term "alignment direction" of an alignment film herein refers to the direction in which the liquid crystal molecules are aligned on the alignment film by a treatment (for example, rubbing treatment) that imparts an orientation-restricting force on the alignment film. When the treatment performed on the alignment film is a rubbing treatment, the alignment direction of the alignment film is usually the rubbing direction.

The "longitudinal direction" of a strip pattern herein refers to the direction in which the long side of a pattern having a short side (width) and a long side (length) extends when the strip pattern is viewed in a plan view. The strip pattern shall include a rectangular pattern in a plan view, and shall also include a pattern that bends or curves at least once in the middle of its long side.

Figure 1:
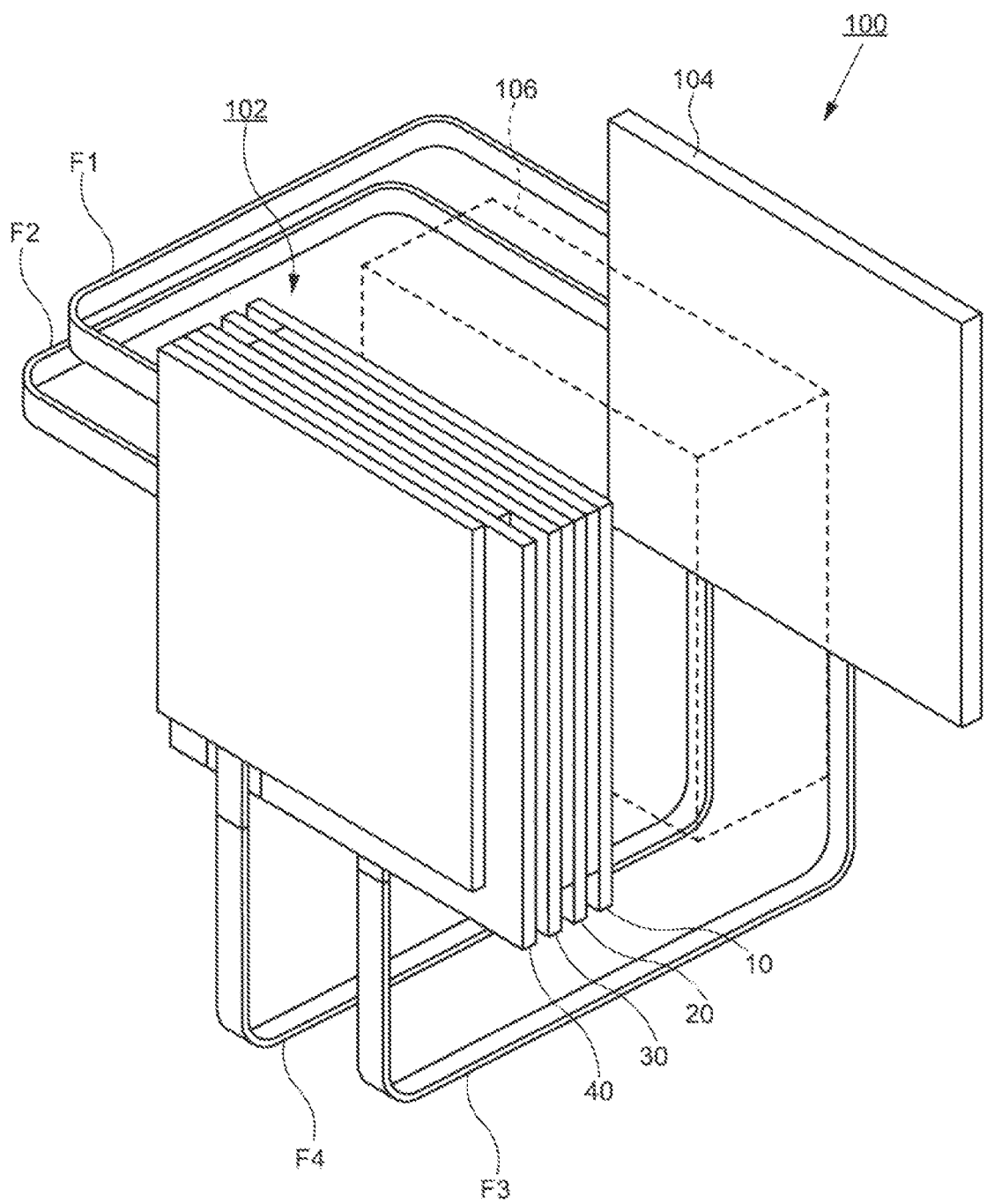
FIG. 1 is a perspective view of a liquid crystal light control device according to an embodiment of the present invention.

FIG. 1 shows a diagram of a liquid crystal light control device 100 according to an embodiment of the present invention. The liquid crystal light control device 100 includes a liquid crystal light control element 102 and a circuit board 104. The liquid crystal light control element 102 includes a plurality of liquid crystal cells. The liquid crystal light control element 102 according to the present embodiment is preferably configured with a plurality of liquid crystal cells, for example, two liquid crystal cells or four liquid crystal cells.

FIG. 1 shows a configuration in which the liquid crystal light control element 102 is configured with a first liquid crystal cell 10, a second liquid crystal cell 20, a third liquid crystal cell 30, and a fourth liquid crystal cell 40. The first liquid crystal cell 10, the second liquid crystal cell 20, the third liquid crystal cell and the fourth liquid crystal cell 40 are flat panels, and the flat surfaces of the respective liquid crystal cells are arranged overlapping each other. Transparent adhesive layers, not shown, are arranged between the first liquid crystal cell 10 and the second liquid crystal cell 20, between the second liquid crystal cell 20 and the third liquid crystal cell 30, and between the third liquid crystal cell 30 and the fourth liquid crystal cell 40. The liquid crystal light control element 102 has a structure in which the liquid crystal cells arranged adjacent to each other in the front and rear are bonded to each other by the transparent adhesive layer.

The circuit board 104 includes a circuit that drives the liquid crystal light control element 102. The first liquid crystal cell 10 is connected to the circuit board 104 by a first flexible wiring substrate F1, the second liquid crystal cell 20 is connected to the circuit board 104 by a second flexible wiring substrate F2, the third liquid crystal cell 30 is connected to the circuit board 104 by a third flexible wiring substrate F3, and the fourth liquid crystal cell 40 is connected to the circuit board 104 by a fourth flexible wiring substrate F4. The circuit board 104 outputs control signals to each liquid crystal cell to control the alignment state of the liquid crystal via the flexible wiring substrates.

A light source unit 106 is arranged on the rear side of the liquid crystal light control element 102 in the liquid crystal light control device 100 shown in FIG. 1. The liquid crystal light control device 100 is configured so that light emitted from the light source unit 106 is emitted through the liquid crystal light control element 102 to the front side of the drawing. The liquid crystal light control element 102 has the first liquid crystal cell 10, the second liquid crystal cell 20, the third liquid crystal cell 30, and the fourth liquid crystal cell 40 arranged in this order from the side of the light source unit 106.

The light source unit 106 includes a white light source, and an optical element such as at least one lens may be arranged between the white light source and the liquid crystal light control element 102, as required. The white light source is a light source that radiates light close to natural light, and may be a light source that radiates dimmed light, such as daylight white or a light bulb color. The light source unit 106 is preferably composed of a light source with a narrow light distribution range, for example, the light source unit 106 is preferably composed of an LED light source combined with a reflector, lens, or the like. The liquid crystal light control device 100 has a function of controlling the diffusion direction of light emitted from the light source unit 106 by the liquid crystal light control element 102. The liquid crystal light control element 102 is capable of forming the light emitted from the light source unit 106 into a predetermined light distribution pattern, such as a square or line pattern.

Figure 2:
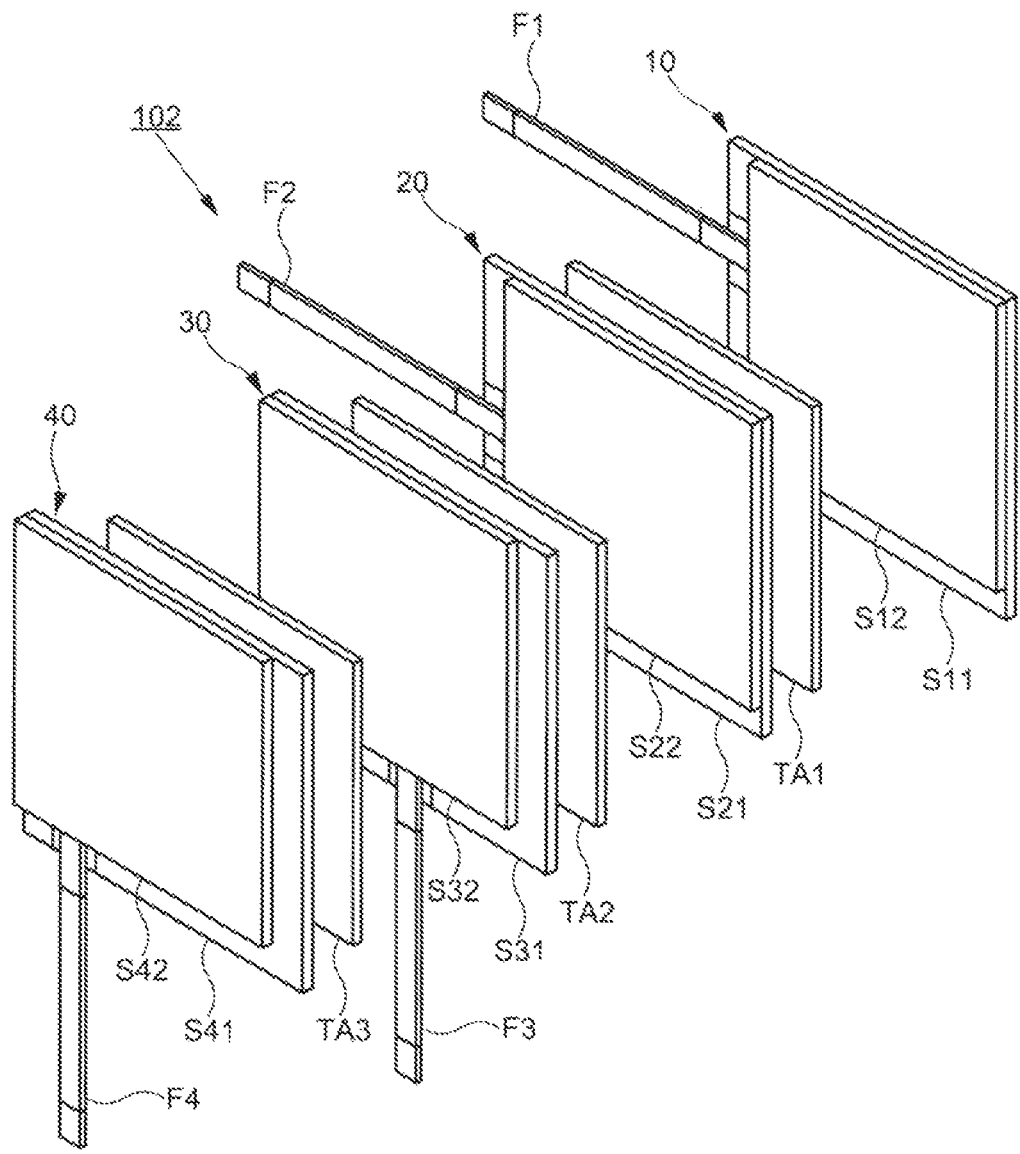
FIG. 2 is exploded view of a liquid crystal light control element that configures a liquid crystal light control device according to an embodiment of the present invention.

FIG. 2 shows an exploded view of the liquid crystal light control element 102 shown in FIG. 1. The liquid crystal light control element 102 is shown as an example including a first liquid crystal cell 10, a second liquid crystal cell 20, a third liquid crystal cell 30, and a fourth liquid crystal cell 40. The liquid crystal light control element 102 is not limited to the configuration shown in the figure and may, for example, be composed of two liquid crystal cells, the first liquid crystal cell 10 and the second liquid crystal cell 20.

The first liquid crystal cell 10 includes a first substrate S11 and a second substrate S12. The first substrate S11 and the second substrate S12 are arranged opposite each other with a gap. A liquid crystal layer, not shown, is arranged in the gap between the first substrate S11 and the second substrate S12. The first flexible wiring substrate F1 is connected to the first substrate S11.

The second liquid crystal cell 20 includes a first substrate S21, a second substrate S22, and the second flexible wiring substrate F2, and has the same configuration as the first liquid crystal cell 10. The third liquid crystal cell 30 includes a first substrate S31, a second substrate S32, and the third flexible wiring substrate F3, and has the same configuration as the first liquid crystal cell 10. The fourth liquid crystal cell 40 includes a first substrate S41, a second substrate S42, and the fourth flexible wiring substrate F4, and has the same configuration as the first liquid crystal cell 10.

A first transparent adhesive layer TA1 is arranged between the first liquid crystal cell 10 and the second liquid crystal cell 20. The first transparent adhesive layer TA1 transmits visible light and is arranged to bond the second substrate S12 of the first liquid crystal cell 10 and the first substrate S21 of the second liquid crystal cell 20. A second transparent adhesion layer TA2 is arranged between the second liquid crystal cell 20 and the third liquid crystal cell 30. The second transparent adhesive layer TA2 is arranged to transmit visible light and to bond the second substrate S22 of the second liquid crystal cell 20 and the first substrate S31 of the third liquid crystal cell 30. A third transparent adhesion layer TA3 is arranged between the third liquid crystal cell and the fourth liquid crystal cell 40. The third transparent adhesive layer TA3 is arranged to transmit visible light and to bond the second substrate S32 of the third liquid crystal cell 30 and the first substrate S41 of the fourth liquid crystal cell 40.

The first transparent adhesive layer TA1, the second transparent adhesive layer TA2, and the third transparent adhesive layer TA3 preferably have high transmittance and a refractive index close to that of the first substrates S11, S21, S31, S41 and the second substrates S12, S22, S23, S24. An optical elasticity resin can be used as the first transparent adhesive layer TA1, the second transparent adhesive layer TA2, and the third transparent adhesive layer TA3, for example, an adhesive material including acrylic resin with translucent properties. Since the temperature of the liquid crystal light control element 102 rises due to heat radiated from the light source unit 106, the coefficient of thermal expansion of the first transparent adhesive layer TA1, the second transparent adhesive layer TA2, and the third transparent adhesive layer TA3 preferably has a value close to that of the first substrate and the second substrate.

As described below, the first liquid crystal cell 10, the second liquid crystal cell 20, the third liquid crystal cell 30, and the fourth liquid crystal cell 40 are substantially the same in structure except for the different configuration of the electrodes. The electrodes on the first substrate S11 side of the first liquid crystal cell 10 and the electrodes on the third substrate S31 side of the third liquid crystal cell 30 are arranged so that they cross each other in the liquid crystal light control element 102 according to the present embodiment. The patterns of the electrodes of the first liquid crystal cell 10 and the third liquid crystal cell 30 may be formed to intersect each other, as shown in FIG. 2, and one of the first liquid crystal cell 10 and the third liquid crystal cell 30 may be rotated by a predetermined angle (90 degrees in this embodiment).

Each liquid crystal cell configuring the liquid crystal light control element 102 includes strip electrodes arranged side by side on the main surface of the substrate, and the strip electrodes generate a transverse electric field. The strip electrodes are not oriented in the same direction in all liquid crystal cells, but are arranged tilted (rotated) from 0 to 180 degrees on the first substrate and the second substrate of each liquid crystal cell, when a certain direction is 0 degrees. The liquid crystal light control element 102 according to the present embodiment can suppress the occurrence of moiré and non-uniformity of brightness (color irregularity) by devising the arrangement of electrode patterns of each liquid crystal cell. This is explained in detail below.

Figure 3:
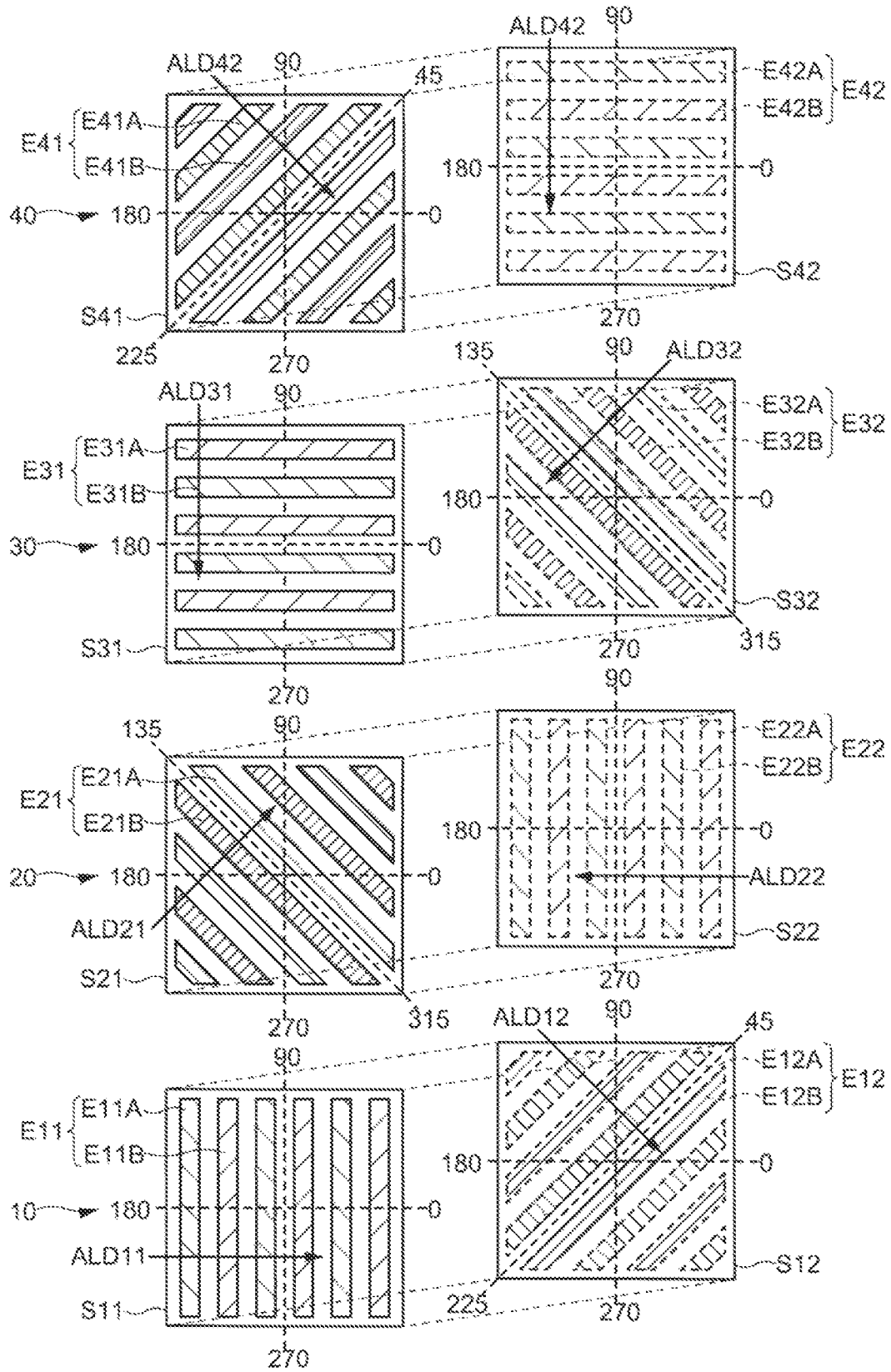
FIG. 3 is an arrangement of the electrodes of a first liquid crystal cell, a second liquid crystal cell, a third liquid crystal cell, and a fourth liquid crystal cell configuring a liquid crystal light control element according to an embodiment of the present invention.

FIG. 3 is an exploded view schematically showing the arrangement of electrodes in each of the first liquid crystal cell 10, the second liquid crystal cell the third liquid crystal cell 30, and the fourth liquid crystal cell 40. FIG. 3 shows an arrangement of the electrodes of the first liquid crystal cell 10, the second liquid crystal cell 20, the third liquid crystal cell 30, and the fourth liquid crystal cell 40, starting from the bottom. FIG. 3 shows the strip electrodes on the first substrate and the second substrate of each liquid crystal cell as viewed from the second substrate side.

A first electrode E11 is arranged on the first substrate S11 and a second electrode E12 is arranged on the second substrate S12 in the first liquid crystal cell 10. The first electrode E11 includes a plurality of first strip electrodes E11A and a plurality of second strip electrodes E11B formed in a strip shape. The first strip electrodes E11A and the second strip electrodes E11B are arranged alternately. The second electrode E12 includes a plurality of third strip electrodes E12A and a plurality of fourth strip electrodes E12B formed in a strip shape. The third strip electrodes E12A and the fourth strip electrodes E12B are arranged alternately. In actuality, the first substrate S11 and the second substrate S12 are arranged facing each other, and such a facing surface can be defined as an inner surface, and the surface opposite the inner surface can be defined as an outer surface. In this case, the first electrode E11 is arranged on the inner surface of the first substrate S11 and the second electrode E12 is arranged on the inner surface of the second substrate S12. The same is true for the second liquid crystal cell 20, the third liquid crystal cell 30, and the fourth liquid crystal cell 40 described below.

The second liquid crystal cell 20 includes a first electrode E21 and a second electrode E22, the third liquid crystal cell 30 includes a first electrode E31 and a second electrode E32, and the fourth liquid crystal cell 40 includes a first electrode E41 and a second electrode E42. The first electrodes E21, E31, E41 and the second electrodes E22, E32, E42 each have a plurality of strip electrodes.

FIG. 3 shows a longitudinal direction of the first electrode E11 of the first liquid crystal cell 10 (a longitudinal direction of the first strip electrode E11A and the second strip electrode E11B) parallel to 90-270 degrees (the direction from degrees to 270 degrees in the figure. The same applies hereinafter) and a longitudinal direction of the second electrode E21 (a longitudinal direction of the third strip electrode E12A and the fourth strip electrode E12B) is arranged in a direction parallel to 45-225 degrees (the direction from 90 degrees to 270 degrees in the figure). Similarly, the second liquid crystal cell 20 is arranged with a longitudinal direction of the first electrode E21 parallel to 135-315 degrees and the second electrode E21 parallel to 90-270 degrees, the third liquid crystal cell 30 is arranged with a longitudinal direction of the first electrode E31 parallel to 0-180 degrees and the second electrode E32 parallel to 135-315 degrees, and the fourth liquid crystal cell 40 is arranged with a longitudinal direction of the first electrode E41 parallel to 45-225 degrees and the second electrode E42 parallel to 0-180 degrees.

According to the arrangement of electrodes shown in FIG. 3, the first electrode E11 of the first liquid crystal cell 10 is arranged to intersect the first electrode E31 of the third liquid crystal cell 30, and the second electrode E12 of the first liquid crystal cell 10 intersects the second electrode E32 of the third liquid crystal cell 30. The first electrode E21 of the second liquid crystal cell 20 is arranged to intersect the first electrode E41 of the fourth liquid crystal cell 40, and the second electrode E22 is arranged to intersect the second electrode E42 of the fourth liquid crystal cell 40. In other words, the longitudinal direction (direction of extension) of the first electrode of each liquid crystal cell is different, and the longitudinal direction (direction of extension) of the second electrode is not the same but also different.

Although alignment films arranged on each substrate are omitted from FIG. 3, the alignment directions of the alignment films are indicated by arrows. An alignment direction ALD11 of the alignment film of the first substrate S11 of the first liquid crystal cell 10 is aligned in a direction that intersects the longitudinal direction of the first electrode E11, that is, it is aligned in the direction of 0-180 degrees, and an alignment direction ALD12 of the alignment film of the second substrate S12 is aligned in the direction that intersects the longitudinal direction of the second electrode E12, that is, parallel to the direction of 135-315 degrees. The same applies to the second liquid crystal cell 20, the third liquid crystal cell 30, and the fourth liquid crystal cell 40, where the alignment film on each substrate is aligned in the directions that intersect the longitudinal direction of each electrode. The angle at which the respective alignment direction intersects the electrodes can be set within a range of 90 degrees±10 degrees.

Although not shown in FIG. 3, the liquid crystal layer is arranged between the first substrate and the second substrate of each liquid crystal cell. The initial alignment state of the liquid crystal layer is determined by the alignment direction of the alignment film, and voltage applied to the first electrode and the second electrode controls the alignment state of the liquid crystal molecules.

The first liquid crystal cell 10, the second liquid crystal cell 20, the third liquid crystal cell 30, and the fourth liquid crystal cell 40 have substantially the same configuration, except that the arrangement of electrodes and the alignment direction of alignment films are different. The following is a more specific description of the first liquid crystal cell 10 as a representative.

Figure 4A:
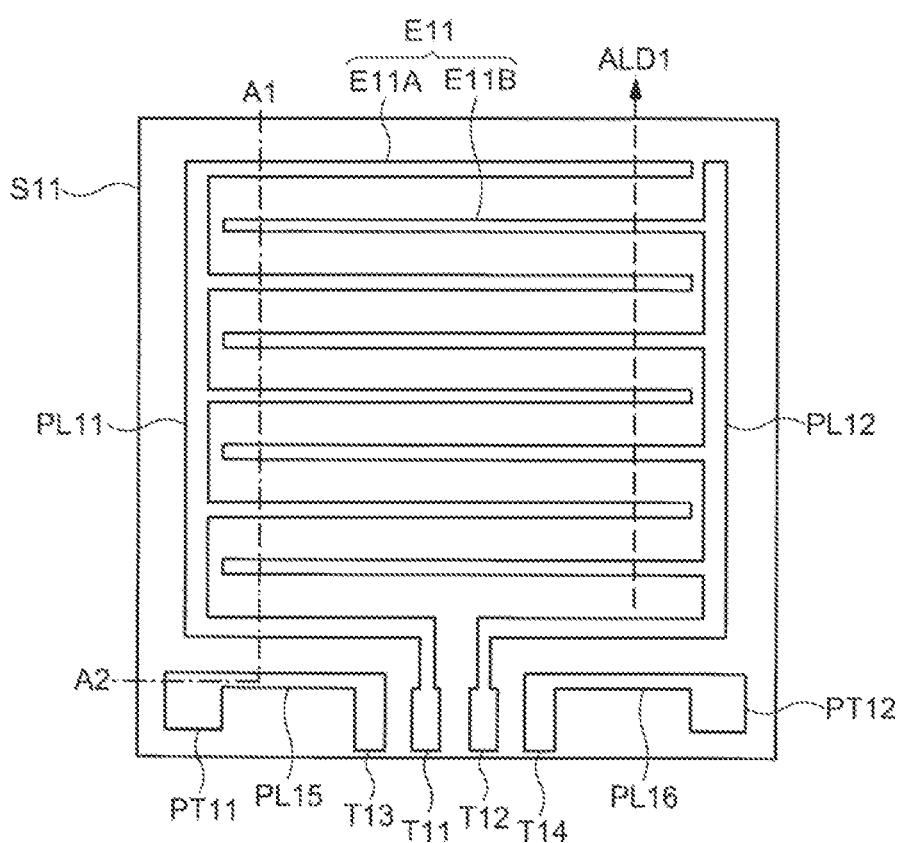
FIG. 4A is a plan view of electrodes on a first substrate of a liquid crystal cell configured with a liquid crystal light control element according to an embodiment of the present invention.
Figure 4B:
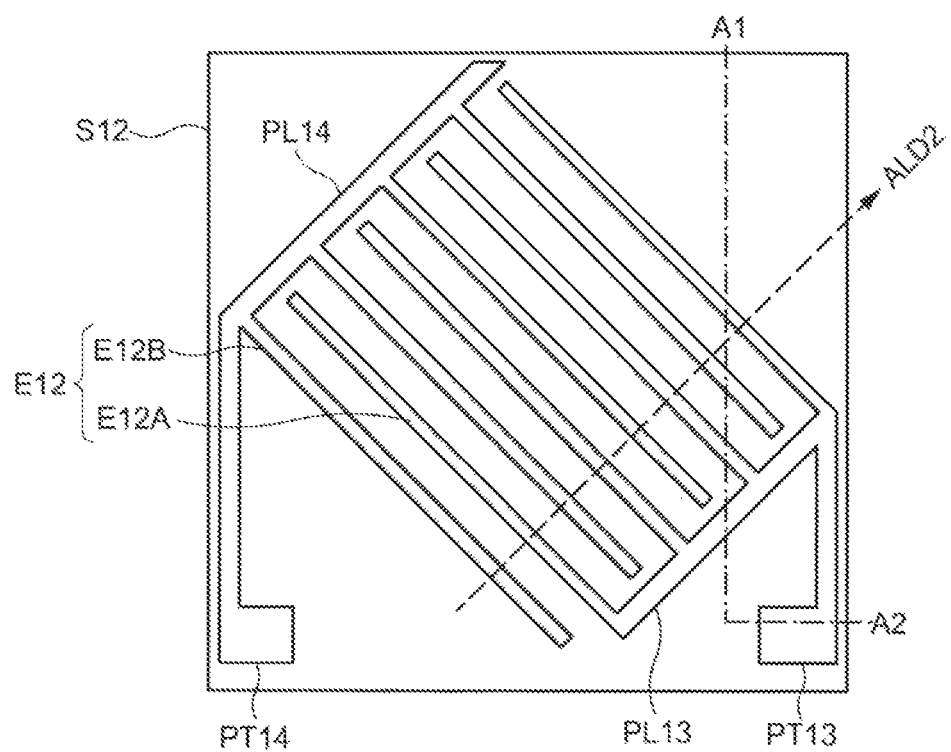
FIG. 4B is a plan view of electrodes on a second substrate of a liquid crystal cell configured with a liquid crystal light control element according to an embodiment of the present invention.

FIG. 4A shows a plan view of the first substrate S11 and FIG. 4B shows a plan view of the second substrate S12. More specifically, FIG. 4A shows a plan view of the inner surface of the first substrate S11 and FIG. 4B shows a plan view of the inner surface of the second substrate S12.

As shown in FIG. 4A, the first electrode E11 is arranged on the first substrate S11. The first electrode E11 includes the plurality of first strip electrodes E11A and the plurality of second strip electrodes E11B. The plurality of first strip electrodes E11A and the plurality of second strip electrodes E11B have a strip pattern. The strip patterns of the plurality of first strip electrodes E11A and the strip patterns of the plurality of second strip electrodes E11B are arranged alternately in a direction intersecting the longitudinal direction and separated by a predetermined interval.

The plurality of first strip electrodes E11A are each connected to a first power supply line PL11, and the plurality of second strip electrodes E11B are each connected to a second power supply line PL12. The first power supply line PL11 is connected to a first connection terminal T11, and the second power supply line PL12 is connected to a second connection terminal T12. The first connection terminal T11 and the second connection terminal T12 are arranged along one edge of the first substrate S11. A third connection terminal T13 is arranged adjacent to the first connection terminal T11 and a fourth connection terminal T14 is arranged adjacent to the second connection terminal T12 on the first substrate S11. The third connection terminal T13 is connected to the fifth power supply line PL15. The fifth power supply line PL15 is connected to a first power supply terminal PT11 at a predetermined position in the plane of the first substrate S11. The fourth connection terminal T14 is connected to a sixth power supply line PL16. The sixth power supply line PL16 is connected to a second power supply terminal PT12 arranged at a predetermined location in the plane of the first substrate S11.

The plurality of first strip electrodes E11A are connected to the first power supply line PL11 to apply the same voltage. The plurality of second strip electrodes E11B are connected to the second power supply line PL12 to apply the same voltage. As shown in FIG. 4A, the plurality of first strip electrodes E11A and the plurality of second strip electrodes E11B are arranged alternately. The plurality of first strip electrodes E11A and the plurality of second strip electrodes E11B are electrically separated. When different levels of voltage are applied to the plurality of first strip electrodes E11A and the plurality of second strip electrodes E11B, an electric field is generated between the two electrodes due to the difference in potential. That is, a transverse electric field can be generated by the plurality of first strip electrodes E11A and the plurality of second strip electrodes E11B.

As shown in FIG. 4B, the second substrate S12 is arranged with the second electrode E12. The second electrode E12 includes a plurality of third strip electrodes E12A and a plurality of fourth strip electrodes E12B. The plurality of third strip electrodes E12A and the plurality of fourth strip electrodes E12B have a strip pattern. The strip patterns of the plurality of third strip electrodes E12A and the plurality of fourth strip electrodes E12B are arranged alternately in a direction intersecting the longitudinal direction and separated by a predetermined interval. The plurality of third strip electrodes E12A and the plurality of fourth strip electrodes E12B are arranged at an angle of 45 degrees to the longitudinal direction of the plurality of first strip electrodes E11A and the plurality of second strip electrodes E11B. The angle at which the plurality of third strip electrodes E12A and the plurality of fourth strip electrodes E12B intersect the plurality of first strip electrodes E11A and the plurality of second strip electrodes E11B can be set within 45 degrees±10 degrees.

The plurality of third strip electrodes E12A are each connected to a third power supply line PL13, and the plurality of fourth strip electrodes E12B are each connected to a fourth power supply line PL14. The third power supply line PL13 is connected to a third power supply terminal PT13, and the fourth power supply line PL14 is connected to a fourth power supply terminal PT14. The third power supply terminal PT13 is arranged at a position corresponding to the first power supply terminal PT11 on the first substrate S11, and the fourth power supply terminal PT14 is arranged at a position corresponding to the second power supply terminal PT12 on the first substrate S11.

The plurality of third strip electrodes E12A are connected to the third power supply line PL13 to apply the same voltage. The plurality of fourth strip electrodes E12B are connected to the fourth power supply line PL14 to apply the same voltage. As shown in FIG. 4B, the plurality of third strip electrodes E12A and the plurality of fourth strip electrodes E12B are arranged alternately. The plurality of third strip electrodes E12A and the plurality of fourth strip electrodes E12B are electrically separated. When different levels of voltage are applied to the plurality of third strip electrodes E12A and the plurality of fourth strip electrodes E12B, an electric field is generated between the two electrodes due to the potential difference. That is, a transverse direction electric field can be generated by the plurality of third strip electrodes E12A and the plurality of fourth strip electrodes E12B.

The first connection terminal T11, the second connection terminal T12, the third connection terminal T13, and the fourth connection terminal T14 on the first substrate S11 are terminals to be connected to a flexible wiring substrate. The first power supply terminal PT11 and the third power supply terminal PT13 are electrically connected by a conductive material, and the second power supply terminal PT12 and the fourth power supply terminal PT14 are electrically connected to the conductive material in the first liquid crystal cell 10.

Figure 5:
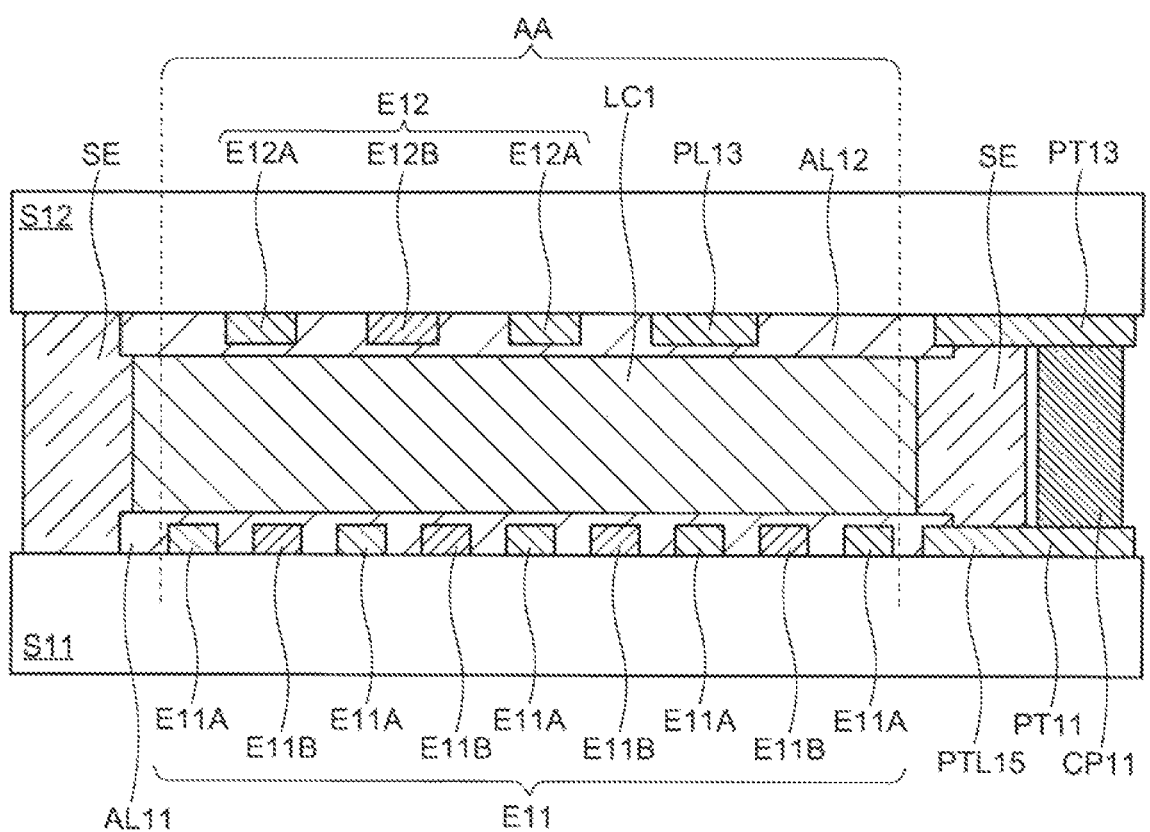
FIG. 5 is an example of a cross-sectional structure of a liquid crystal cell configured with a liquid crystal light control element according to an embodiment of the present invention.

FIG. 5 shows a cross-sectional view of the first liquid crystal cell 10. The cross-sectional structure of the first liquid crystal cell 10 shown in FIG. 5 corresponds to the line A1-A2 of the first substrate S11 shown in FIG. 4A and the second substrate S12 shown in FIG. 4B.

The first liquid crystal cell 10 has an effective region AA that can polarize and scatter (diffuse) incident light. The first electrode E11 and the second electrode E12 are arranged in the effective region AA. The first substrate S11 and the second substrate S12 are bonded by a sealant SE arranged outside the effective region AA. A gap between the first substrate S11 and the second substrate S12 encapsulates a first liquid crystal layer LC1. The first liquid crystal layer LC1 is sealed between the first substrate S11 and the second substrate S12 by the sealant SE.

The first substrate S11 includes the first electrode E11, the first power supply terminal PT11, and a first alignment film AL11 over the first electrode E11. The first electrode E11 includes a first strip electrode E11A and a second strip electrode E11B. The first power supply terminal PT11 has a structure continuous from the fifth power supply line PL15 and arranged outside the seal material SE.

The second substrate S12 includes the second electrode E12, the third power supply terminal PT13, and a second alignment film AL12 over the second electrode E12. The second electrode E12 includes the third strip electrode E12A and the fourth strip electrode E12B. The third power supply terminal PT13 has a structure continuous from the third power supply line PL13 and is arranged outside the sealant SE.

The first electrode E11 and the second electrode E12 are arranged so that the longitudinal directions of the strip electrode patterns intersect. That is, the longitudinal directions of the first strip electrode E11A and the second strip electrode E11B are arranged so that the longitudinal directions of the third strip electrode E12A and the fourth strip electrode E12B intersect. The first strip electrode E11A and the second strip electrode E11B and the third strip electrode E12A and the fourth strip electrode E12B intersect at an angle of approximately degrees in this embodiment. The intersecting angle between the first electrode E11 and the second electrode E12 can be set in the range of 45 degrees±10 degrees, for example. Since the first electrode E11 and second electrode E12 are arranged not only along the X-axis direction and the Y-axis direction, but also in a rotated direction within a range of 45 degrees±10 degrees, it is possible to increase the number of combinations of electrode arrangement, even when a plurality of liquid crystal cells are stacked on each other, and it is possible to prevent interference and moiré from occurring in the liquid crystal light control element 102 by not overlapping liquid crystal cells having the same electrode arrangement.

The first power supply terminal PT11 and the third power supply terminal PT13 are arranged opposite and facing each other in a region outside the sealant SE. A first conductive member CP11 is arranged between the first power supply terminal PT11 and the third power supply terminal PT13 to electrically connect the two terminals. The first conductive member CP11 can be formed with a conductive paste material, for example, silver paste or carbon paste. Although not shown in FIG. 5, the second power supply terminal PT12 and the fourth power supply terminal PT14 are also electrically connected by conductive members in the same way.

The first substrate S11 and the second substrate S12 are transparent substrates, for example, glass substrate or resin substrate. The first electrode E11 and the second electrode E12 are transparent electrodes formed by a transparent conductive material such as indium tin oxide (ITO) or indium zinc oxide (IZO). The power supply lines (first power supply line PL11, second power supply line PL12, third power supply line PL13, fourth power supply line PL14, fifth power supply line PL15, and sixth power supply line PL16), the connection terminals (first connection terminal T11, second connection terminal T12, third connection terminal T13, and fourth connection terminal T14) and the power supply terminals (first power supply terminal PT11, second power supply terminal PT12, third power supply terminal PT13, and fourth power supply terminal PT14) are formed by metallic materials such as aluminum, titanium, molybdenum, and tungsten. The power supply lines (first power supply line PL11, second power supply line PL12, third power supply line PL13, fourth power supply line PL14, fifth power supply line PL15, and sixth power supply line PL16) may be formed of the same transparent conducting film as the first electrode E11 and the second electrode E12. The first alignment film AL1 and the second alignment film AL2 are formed by horizontally oriented films having an orientation regulating force that is parallel to the primary plane of the substrate. The first liquid crystal layer LC1 is, for example, a twisted nematic liquid crystal (TN (Twisted Nematic) liquid crystal). Although not shown in FIG. spacers may be arranged between the first substrate S11 and the second substrate S12 to keep the distance between the two substrates constant.

Figure 6A:
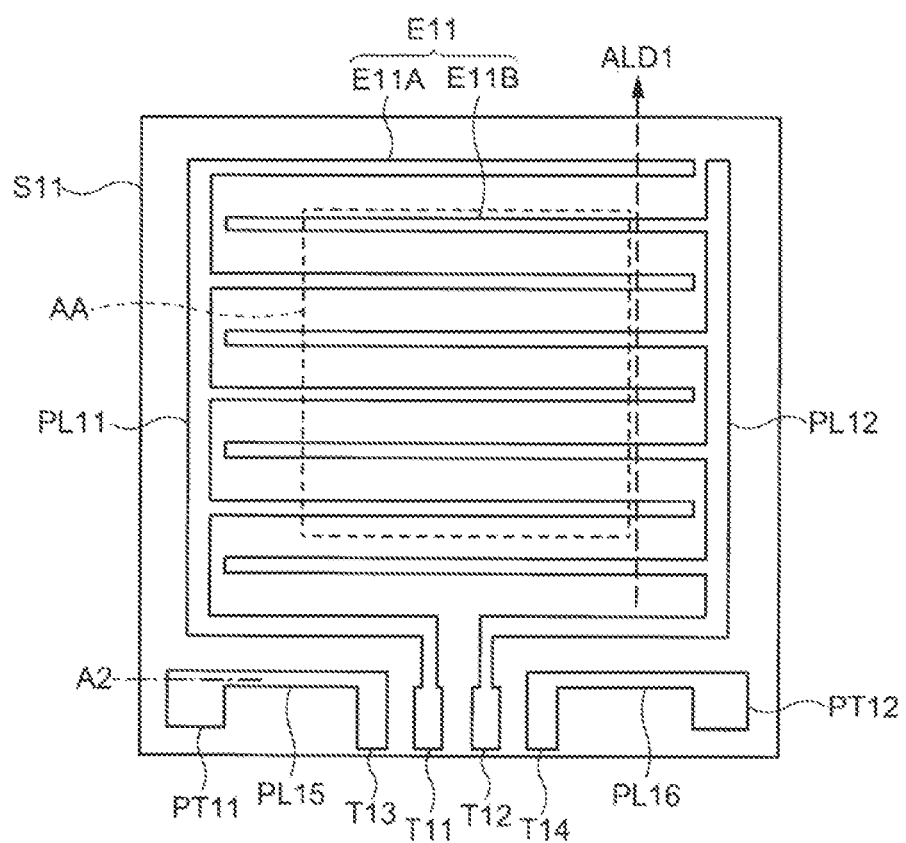
FIG. 6A is a plan view of electrodes on a first substrate of a liquid crystal cell configured with a liquid crystal light control element according to an embodiment of the present invention.
Figure 6B:
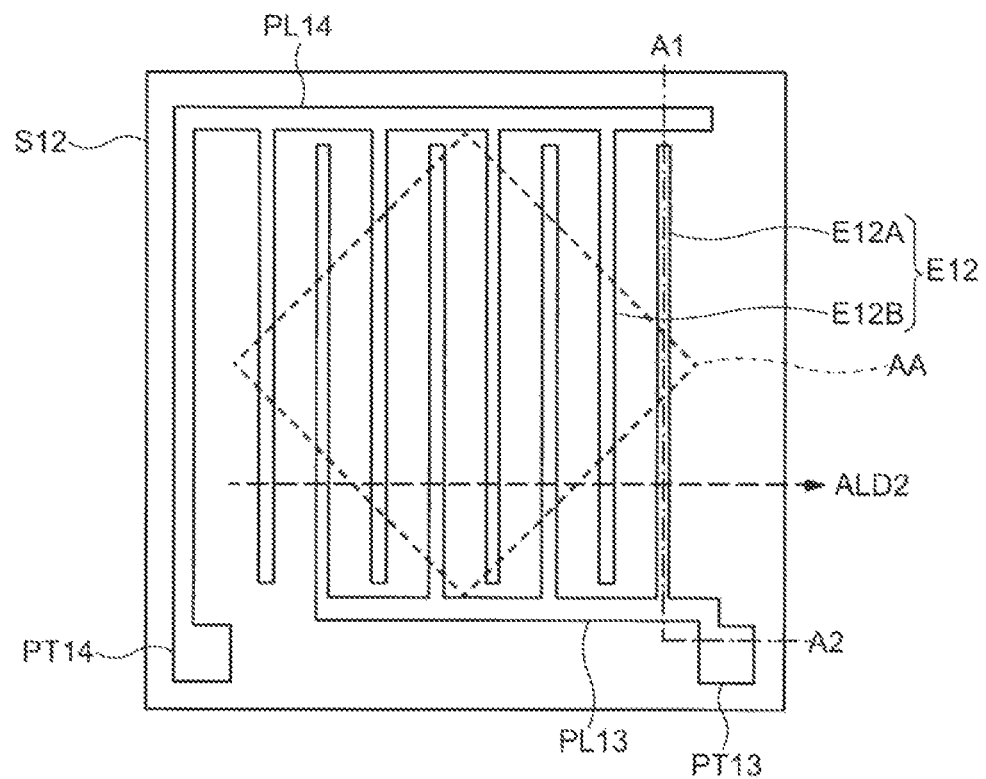
FIG. 6B is a plan view of electrodes on a second substrate of a liquid crystal cell configured with a liquid crystal light control element according to an embodiment of the present invention.

FIG. 4 shows a pattern in which the third strip electrode E12A and the fourth strip electrode E12B on the second substrate S12 side are placed diagonally on the substrate, though, as shown in FIG. 6A and FIG. 6B, a liquid crystal cell may be configured by using the first substrate S11 and second substrate S12 formed so that the effective regions AA are aligned, and rotating one substrate by a predetermined angle and pasting them together.

Figure 7A:
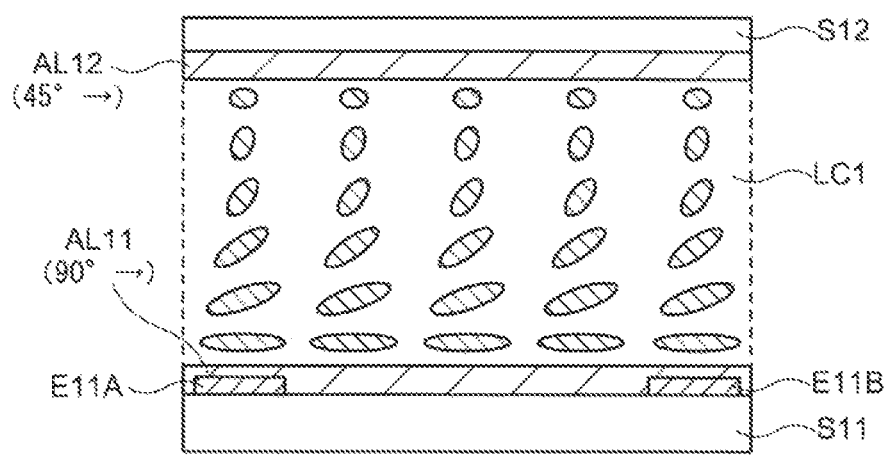
FIG. 7A is an illustration of the operation of a liquid crystal cell configured with a liquid crystal light control element according to an embodiment of the present invention, and shows an alignment state of liquid crystal molecules in a state when a voltage is not applied.
Figure 7B:
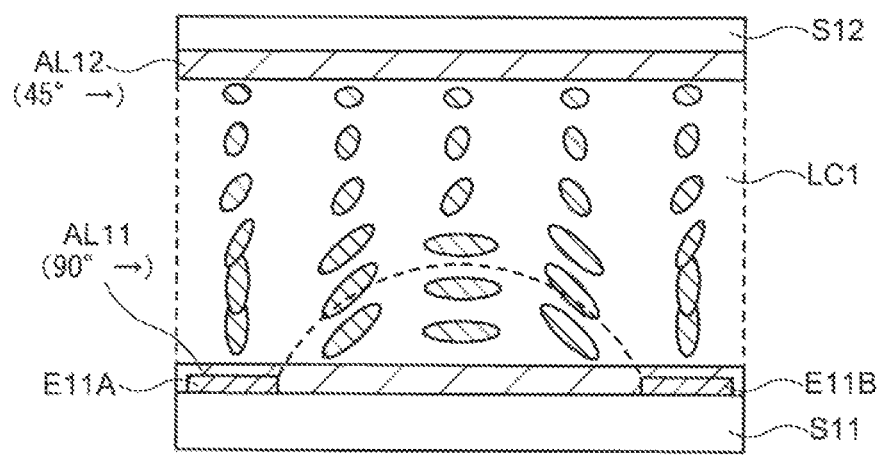
FIG. 7B is an illustration of an operation of a liquid crystal cell configured with a liquid crystal light control element according to an embodiment of the present invention, and shows an alignment state of the liquid crystal molecules when a voltage is applied to the first electrode.

Next, the electro-optical effects of the first liquid crystal cell 10 are described below. FIG. 7A and FIG. 7B show the partial cross-sectional schematic structure of the first liquid crystal cell 10, and the elements necessary for the explanation are illustrated. FIG. 7A and FIG. 7B show the first strip electrode E11A, the second strip electrode E11B, the first alignment film AL11, the second alignment film AL12 on the second substrate S12, and the first liquid crystal layer LC1. The third strip electrode E12A and the fourth strip electrode E12B are omitted in FIG. 7A and FIG. 7B to simplify the explanation.

FIG. 7A shows that the alignment direction of the first alignment film AL11 differs from the alignment direction of the second alignment film AL12. Specifically, the first alignment film AL11 is treated for alignment in the alignment direction ALD1 that intersects the longitudinal direction of the first strip electrode E11A and the second strip electrode E11B at an angle of 90 degrees, as shown in FIG. 4A, and the second alignment film AL12 is treated for alignment in the alignment direction ALD2 that intersects the longitudinal direction of the third strip electrode E12A and the fourth strip electrode E12B at an angle of 90 degrees, as shown in FIG. 4B. Therefore, the alignment direction of the first alignment film AL11 and the alignment direction of the second alignment film AL12 of the first liquid crystal cell 10 shown in FIG. 7A and FIG. 7B intersect at an angle in the range of 45 degrees±10 degrees. The alignment treatment may be a rubbing treatment or a photo-alignment treatment. The alignment direction of the alignment film can be set within a range of 90 degrees±10 degrees relative to the direction of extension of the strip electrode.

TN liquid crystal is used as the first liquid crystal layer LC1. Since the alignment direction ALD1 of the first alignment film AL11 and the alignment direction ALD2 of the second alignment film AL12 intersect, the liquid crystal molecules in the first liquid crystal layer LC1 are aligned from the first alignment film AL11 to the second alignment film AL12 in a state where the long axis direction of the liquid crystal molecules is twisted by 45 degrees without the effect of an external electric field. FIG. 7A shows a state in which no voltage is applied to the first strip electrode E11A and the second strip electrode E11B, and the long axis direction of the liquid crystal molecules is aligned twisted by degrees.

FIG. 7A shows an example where the first liquid crystal layer LC1 is formed of positive type twisted nematic liquid crystal (TN liquid crystal) and the long axis of the liquid crystal molecules is aligned in the same direction as the alignment direction of the alignment film. When negative type liquid crystal is used, it is necessary to rotate the alignment direction of the alignment film by 90 degrees, that is, the alignment direction of each alignment film AL11 and AL12 must be aligned with the direction of extension of the strip electrodes E11A and E12A of each substrate S11 and S12. The liquid crystal is preferably to contain a chiral agent that imparts torsion to the liquid crystal molecules.

FIG. 7B shows a state in which a low-level voltage VL is applied to the first strip electrode E11A and a high-level voltage VH is applied to the second strip electrode E11B. In this state, the transverse electric field is generated between the first strip electrode E11A and the second strip electrode E11B. As shown in FIG. 7B, the liquid crystal molecules on the first substrate S11 side are affected by the transverse electric field and their alignment direction changes. For example, the alignment of the liquid crystal molecules on the first substrate S11 side changes so that the long axis direction is aligned parallel to the direction of the electric field.

Figure 7C:
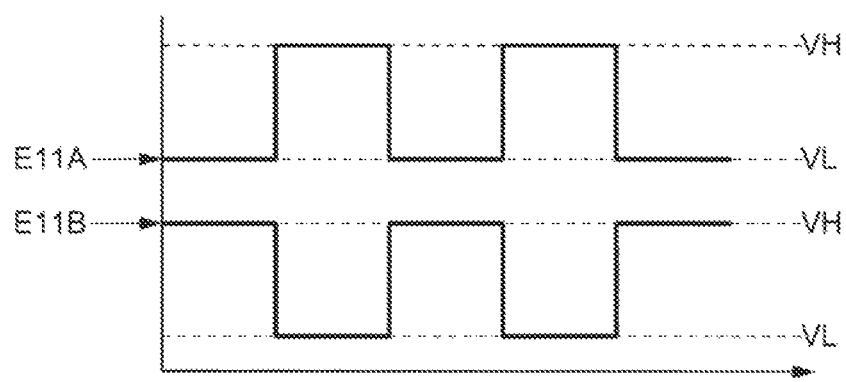
FIG. 7C is an illustration of an operation of a liquid crystal cell configured with a liquid crystal light control element according to an embodiment of the present invention, and shows the waveforms of control signals applied to electrodes driving the liquid crystal.

The values of the low-level voltage VL and the high-level voltage VH applied to the first strip electrode E11A and the second strip electrode E11B are set appropriately. For example, 0 V is applied as the low-level voltage VL1 and to 30 V as the high-level voltage VH1. The voltages that alternate between the low-level voltage VL and the high-level voltage VH are applied to the first strip electrode E11A and the second strip electrode E11B. For example, as shown in FIG. 7C, in a certain period of time, a low-level voltage VL is applied to the first strip electrode E11A and a high-level voltage VH is applied to the second strip electrode E11B, in the next fixed period, the high-level voltage VH is applied to the first strip electrode E11A and the low-level voltage VL is applied to the second strip electrode E11B, and the voltage may be applied so that it changes periodically.

It is possible to suppress the degradation of the first liquid crystal layer LC1 by applying alternating low-level voltage VL and high-level voltage VH to the first strip electrode E11A and the second strip electrode E11B, thereby generating an alternating electric field. The frequency of the voltage applied to the first strip electrode E11A and the second strip electrode E11B should be a frequency at which the liquid crystal molecules can follow the change in the electric field, for example, 15 to 100 Hz.

Figure 8A:
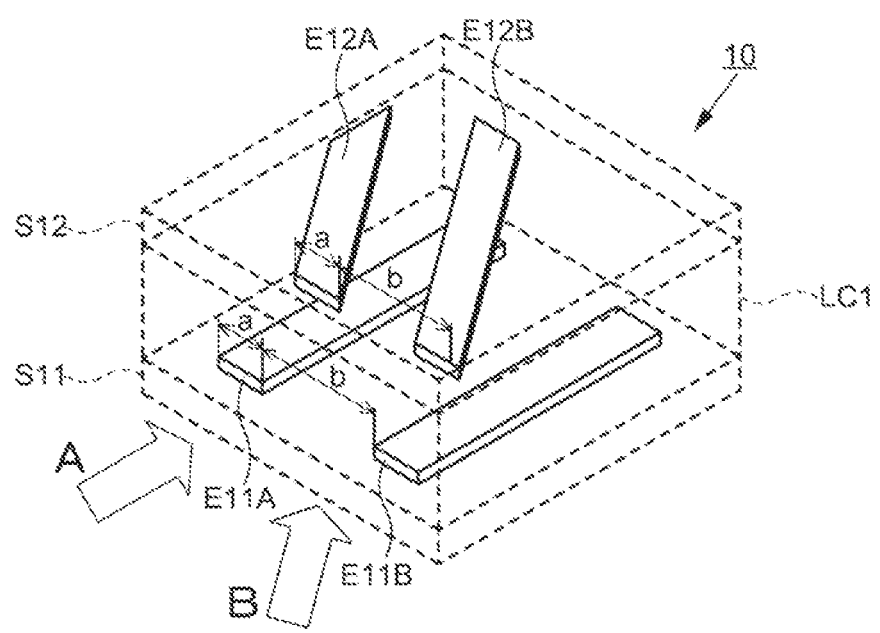
FIG. 8A is an illustration of an operation of a liquid crystal cell configured with a liquid crystal light control element according to an embodiment of the present invention, and shows a perspective view of an arrangement of a first electrode and a second electrode.
Figure 8B:
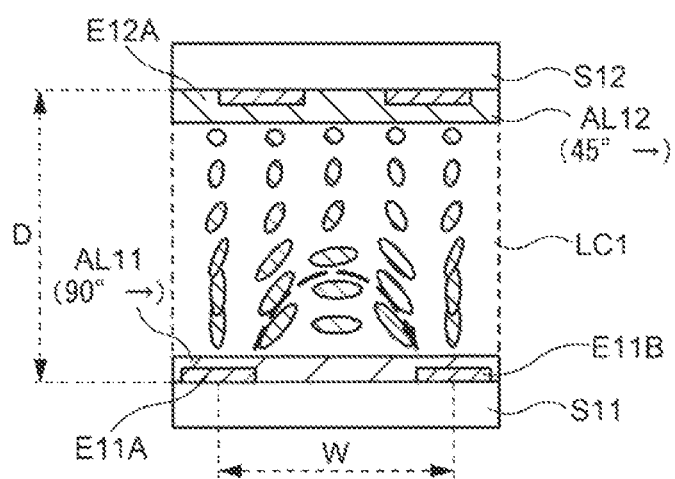
FIG. 8B is an illustration of an operation of a liquid crystal cell configured with a liquid crystal light control element according to an embodiment of the present invention, and shows an alignment state of liquid crystal molecules when a voltage is applied to a first electrode.
Figure 8C:
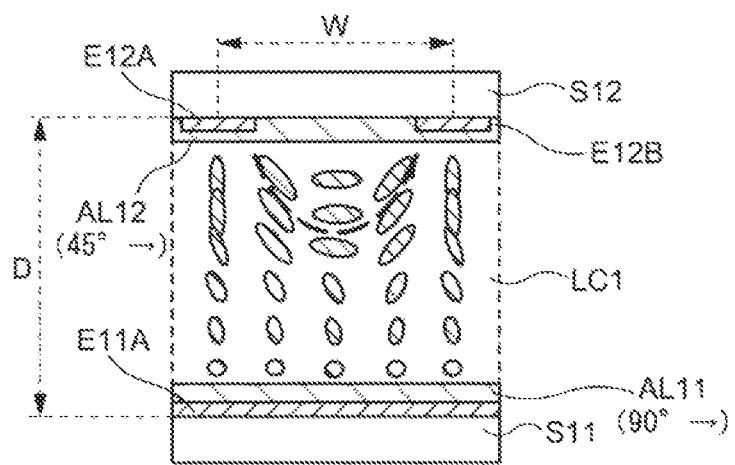
FIG. 8C is an illustration of an operation of a liquid crystal cell configured with a liquid crystal light control element according to an embodiment of the present invention, and shows an alignment state of liquid crystal molecules when a voltage is applied to the second electrode.

FIG. 8A is a partial perspective view of the first liquid crystal cell 10, showing the arrangement of the first strip electrode E11A and the second strip electrode E11B, the third strip electrode E12A and the fourth strip electrode E12B, and the first liquid crystal layer LC1. FIG. 8B and FIG. 8C show cross-sectional schematic views of the first liquid crystal cell 10. FIG. 8B shows a cross-sectional schematic view of the first liquid crystal cell 10 shown in FIG. 8A, viewed from the side A shown in FIG. 8C. FIG. 8B and FIG. 8C show that the alignment treatment direction of the first alignment film AL11 is different from that of the second alignment film AL12.

As shown in FIG. 8B and FIG. 8C, the first strip electrode E11A and the second strip electrode E11B are arranged at a center-to-center distance W, and the third strip electrode E12A and the fourth strip electrode E12B are arranged at a center-to-center distance W, as well. This center-to-center distance W has the relationship W=a+b with respect to the width "a" of the first strip electrode E11A and the distance "b" from the edge of the first strip electrode E11A to the edge of the second strip electrode E11B shown in FIG. 7A.

The first strip electrode E11A and the second strip electrode E11B, and the third strip electrode E12A and the fourth strip electrode E12B are arranged apart and opposite each other at an angle of 45 degrees±10 degrees. The first substrate S11 and the second substrate S12 are arranged opposite each other at a distance D, and the distance D corresponds substantially to the thickness of the first liquid crystal layer LC1. In practice, the first strip electrode E11A and the first alignment film AL11 are arranged on the first substrate S11, while the third strip electrode E12A and the second alignment film AL12 are arranged on the second substrate S12, the thickness of these electrodes and alignment films is sufficiently small compared to the scale of the distance D, so the thickness of the first liquid crystal layer LC1 can be viewed as the same as the distance D.

In the first liquid crystal cell 10, the distance D between the strip electrodes across the first liquid crystal layer LC1 is preferably the same or larger than the center-to-center distance W of the strip electrodes. In other words, the distance D is preferably one or more times as long as the center-to-center distance W. For example, the distance D is preferably at least twice as large as the center-to-center distance W of the strip electrodes. When the width of the first strip electrode E11A is 5 µm, the width "a" of the first strip electrode E11A and the second strip electrode E11B is 5 µm, and the distance "b" from the edge of the first strip electrode E11A to the edge of the second strip electrode E11B is 5 µm, the center-to-center distance W of the strip electrodes is 10 µm. In contrast, the distance D is preferably larger than 10 µm.

With this relationship between the center-to-center distance W of the strip electrodes and the distance D, mutual interference can be suppressed as much as possible with the electric fields generated by the first strip electrode E11A and the second strip electrode E11B and the electric fields generated by the third strip electrode E12A and the fourth strip electrode E12B. That is, as shown in FIG. 8B, when the alignment of liquid crystal molecules in the vicinity is changed by the electric field between the first strip electrode E11A and the second strip electrode E11B, even if an electric field is generated between the third strip electrode E12A and the fourth strip electrode E12B, the effect is minimal because the distance D is sufficiently large. As shown in FIG. 8C, the same is true when an electric field is generated between the third strip electrode E12A and the fourth strip electrode E12B.

It is known that the refractive index of liquid crystals changes depending on their alignment state. As shown in FIG. 7A, in the off state (OFF) in which the electric field is not applied to the first liquid crystal layer LC1, the long axis direction of the liquid crystal molecules is aligned horizontally on the substrate surface and twisted 45 degrees from the first substrate S11 side to the second substrate S12 side. The first liquid crystal layer LC1 has an almost uniform refractive index distribution in this alignment state. Therefore, although they optically rotate due the influence of the initial alignment of the liquid crystal molecules, the first polarized component PL1 and the second polarized component PL2 orthogonal to the first polarized component PL1 of the light incident on the first liquid crystal cell 10 are almost not refracted (or scattered) and pass through the first liquid crystal layer LC1. Here, the first polarized component PL1 corresponds to, for example, P-polarized natural light, and the second polarized component corresponds to, for example, S-polarized natural light.

On the other hand, as shown in FIG. 7B, in the on (ON) state where a voltage is applied to the first strip electrode E11A and the second strip electrode E11B and an electric field is formed, the liquid crystal molecules align so that their long axis follows the electric field, when the first liquid crystal layer LC1 has positive dielectric anisotropy. As a result, as shown in FIG. 7B, a region is formed in which liquid crystal molecules rise almost vertically above the first strip electrode E11A and the second strip electrode E11B, a region is formed oriented obliquely along the distribution of the electric field between the first strip electrode E11A and the second strip electrode E11B, and a region is formed where the initial alignment state is maintained in a region away from the first strip electrode E11A and the second strip electrode E11B, in first liquid crystal layer LC1.

As shown in FIG. 7B, the long axis of the liquid crystal molecules is aligned between the first strip electrode E11A and the second strip electrode E11B in a convex arc along the direction in which the electric field is generated. That is, as shown in FIG. 7A and FIG. 7B, the direction of the initial alignment of the liquid crystal molecules and the direction of the transverse electric field generated between the third strip electrode E12A and the fourth strip electrode E12B are the same, as shown schematically in FIG. 7B, the direction of alignment of the liquid crystal molecules located in the center between the two electrodes changes little, however, the liquid crystal molecules located from the center to both electrodes are aligned at an angle to the normal direction with respect to the surface of the second substrate S12 according to the intensity distribution of the electric field. Therefore, the liquid crystal molecules are aligned in a circular arc between the third strip electrode E12A and the fourth strip electrode E12B.

As shown in FIG. 8B, the arc-shaped refractive index distribution (dielectric constant distribution) is formed in the first liquid crystal layer LC1 on the side of the first substrate S11 under the influence of the transverse electric field by the first strip electrode E11A and the second strip electrode E11B, and polarized components parallel to the direction of the initial alignment of liquid crystal molecules in the incident light are radially diffused. As shown in FIG. 8C, an arc-shaped refractive index distribution is formed in the first liquid crystal layer LC1 on the side of the second substrate S12 under the influence of the transverse electric field by the third stripe electrode E12A and the fourth stripe electrode E12B, and the polarized component parallel to the direction of the initial alignment of liquid crystal molecules in the incident light diffuses radially.

As explained with reference to FIG. 8B and FIG. 8C, the thickness of the first liquid crystal layer LC1 is sufficiently thick to control the diffusion of different polarized components independently on the first substrate S11 side and the second substrate S12 side, respectively.

The liquid crystal molecules have a refractive index anisotropy Δn. Therefore, the first liquid crystal layer LC1 in the on state has a refractive index distribution or retardation distribution according to the alignment state of the liquid crystal molecules. The retardation is expressed as Δn×d when the thickness of the first liquid crystal layer LC1 is "d". When the liquid crystal molecules are aligned in the arc-shape, the polarized component parallel to the long axis direction of the liquid crystal molecules is scattered (diffused) by the refractive index distribution of the first liquid crystal layer LC1 when it is transmitted through the first liquid crystal layer LC1. In this embodiment, the liquid crystal layer with positive liquid crystal molecules is used.

Figure 9:
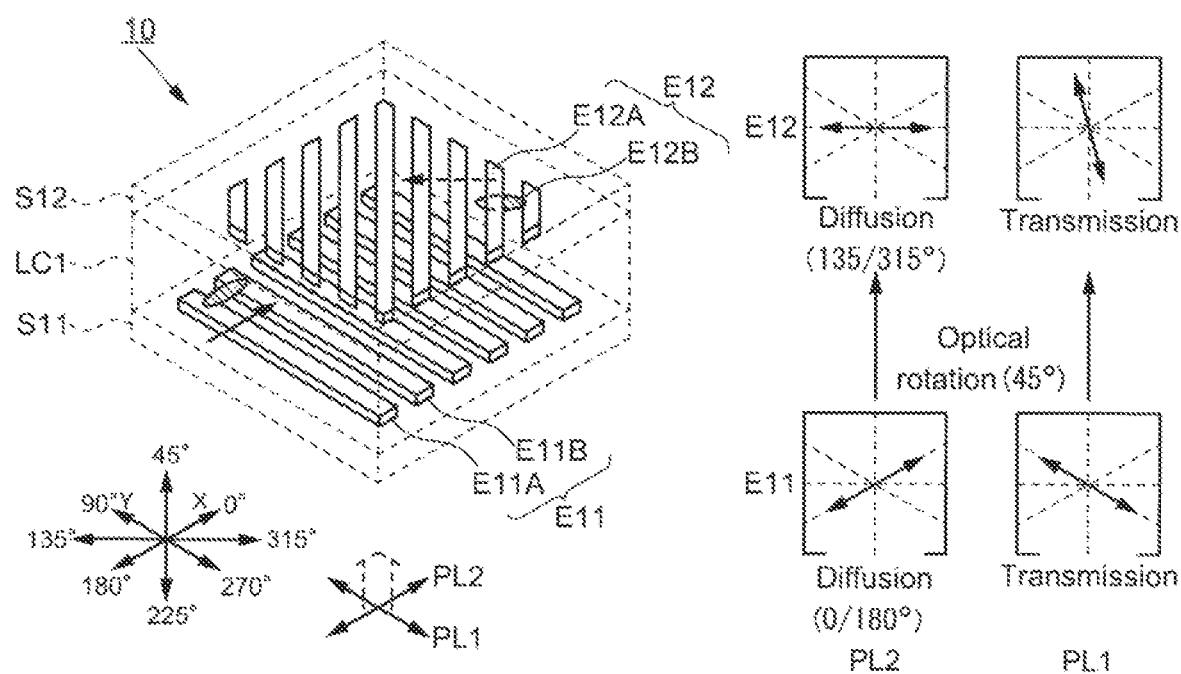
FIG. 9 is a schematic diagram of a phenomenon in which a first polarized component and a second polarized component are diffused by two liquid crystal cells.

FIG. 9 schematically illustrates the phenomenon in which the first polarized component PL1 and the second polarized component PL2 incident on the first liquid crystal cell 10 are diffused by the first liquid crystal layer LC1. FIG. 9 shows the directions of 0 degrees, 45 degrees, 90 degrees, 135 degrees, 180 degrees, 225 degrees, 270 degrees, and 315 degrees as being in the relationship shown in the legend. The X-axis direction is assumed to be the same as the direction of 0-180 degrees, and the Y-axis direction is assumed to be the same as the direction of 90-270 degrees. The direction of 45-225 degrees is defined as the direction along the line segment that bisects the intersection angle between the X-axis and the Y-axis when they are orthogonal to each other. For the following explanation, the X-axis direction may be shown as the direction of 0-180 degrees and the Y-axis direction as the direction of 90-270 degrees. As shown in FIG. 9, the angle of rotation is shown counterclockwise with the X-axis at 0 degrees, and the direction according to the angle of rotation may be indicated as the direction of 45-225 degrees and the direction of 90-270 degrees (Y-axis direction). The relationship between each axis direction and angle shown in FIG. 9 and the relationship of each angle in the diagram showing the direction of the polarization axis of each polarization component on the right side in FIG. 9 is the same for FIG. 10 through FIG. 14.

FIG. 9 shows the electrode arrangement of the first liquid crystal cell 10, the direction of alignment of the alignment film, and the direction of the long axis of the liquid crystal molecules in the left-hand column, each direction being based on the direction shown in the legend. FIG. 9 shows the longitudinal direction of the first strip electrode E11A and the second strip electrode E11B arranged toward the Y-axis direction (the direction of 90-270 degrees), and the longitudinal direction of the third strip electrode E12A and the fourth strip electrode E12B arranged in a direction rotated clockwise within 45 degrees±10 degrees relative to the Y-axis direction (the direction of 45-225 degrees). Therefore, the alignment direction of the alignment film of the first substrate S11 is assumed to be in the X-axis direction, and the alignment direction of the alignment film of the second substrate S12 is assumed to be in the direction rotated 45 degrees clockwise from the X-axis direction (the direction of 135-315 degrees). The first polarized component PL1 is assumed to be polarized in the Y-axis direction and the second polarized component PL2 is assumed to be polarized in the X-axis direction. A potential difference is generated between the first strip electrode E11A and the second strip electrode E11B, and an electric field is generated between them. There is also a potential difference between the third strip electrode E12A and the fourth strip electrode E12B, and an electric field is generated between them.

The right-hand column of FIG. 9 shows the polarization directions of the first polarized component PL1 and the second polarized component PL2, applying the angles shown in the legend. Focusing on the first polarized component PL1 in FIG. 9, the polarization direction of the first polarized component PL1 incident on the first liquid crystal cell 10 is in the direction that intersects (orthogonal to) the long axis direction of the liquid crystal molecules on the first substrate S11 side of the first liquid crystal layer LC1. Therefore, although the liquid crystal molecules on the first substrate S11 side have their refractive index distribution changed by the electric field generated by the first electrode E11, the first polarized component PL1 is not diffused and passes through directly to the second substrate S12 side. The first polarized component PL1 is optically rotated 45 degrees according to the twisting alignment of the liquid crystal molecules in the process of passing through the first liquid crystal layer LC1 from the first substrate S11 side to the second substrate S12 side. The polarization axis of the first polarized component PL1 after the optical rotation is in the direction of 45-225 degrees, which intersects the long axis direction of the liquid crystal molecules on the second substrate S12 side. As a result, although the liquid crystal molecules on the second substrate S12 side have their refractive index distribution changed by the electric field generated by the second electrode E12, the second polarized component PL2 is not affected and is transmitted without being affected by the electric field. Thus, the first polarized component PL1 is optically rotated 45 degrees in the process of passing through the first liquid crystal cell 10, but it is not diffused and passes through the first liquid crystal cell 10.

On the other hand, the polarization direction of the second polarization component PL2 is parallel to the long axis direction of the liquid crystal molecules on the first substrate S11 side of the first liquid crystal layer LC1. Therefore, the liquid crystal molecules on the first substrate S11 side have a refractive index distribution due to the electric field generated by the first electrode E11, and the second polarized component PL2 is diffused by this affect. The second polarized component PL2 is optically rotated 45 degrees according to the twisting alignment of the liquid crystal molecules in the process of passing through the first liquid crystal layer LC1 from the first substrate S11 side to the second substrate S12 side. As a result, the polarization axis of the second polarized component PL2 is in the direction optically rotated 45 degrees clockwise (the direction of 135-315 degrees), which is parallel to the long axis direction of the liquid crystal molecules on the second substrate S12 side. Since the liquid crystal molecules on the second substrate S12 side change the refractive index distribution by the electric field generated by the second electrode E12, the first polarized component PL1 transitioned by the first liquid crystal layer LC1 is diffused in the direction of 135-315 degrees by the refractive index distribution formed by the liquid crystal molecules on the second substrate S12 side. That is, the second polarized component PL2 incident on the first liquid crystal cell 10 is optically rotated 45 degrees in the process of passing through the first liquid crystal cell 10 and diffused in the X-axis direction (direction of 0-180 degrees) and the direction of 135-315 degrees.

As described above, when the second electrode E12 is arranged with respect to the first electrode E11 of the first liquid crystal cell 10 in a rotated state within the range of 45 degrees±10 degrees, there are polarized components that are diffused by the liquid crystal layer and are not diffused depending on the direction of the polarization axis of the incident light. Next, the following will be explained with reference to several examples in the case where a plurality of such liquid crystal cells is arranged in the direction in which the light passes, and the direction of the strip electrodes is different from each other.

First Embodiment

Figure 10:
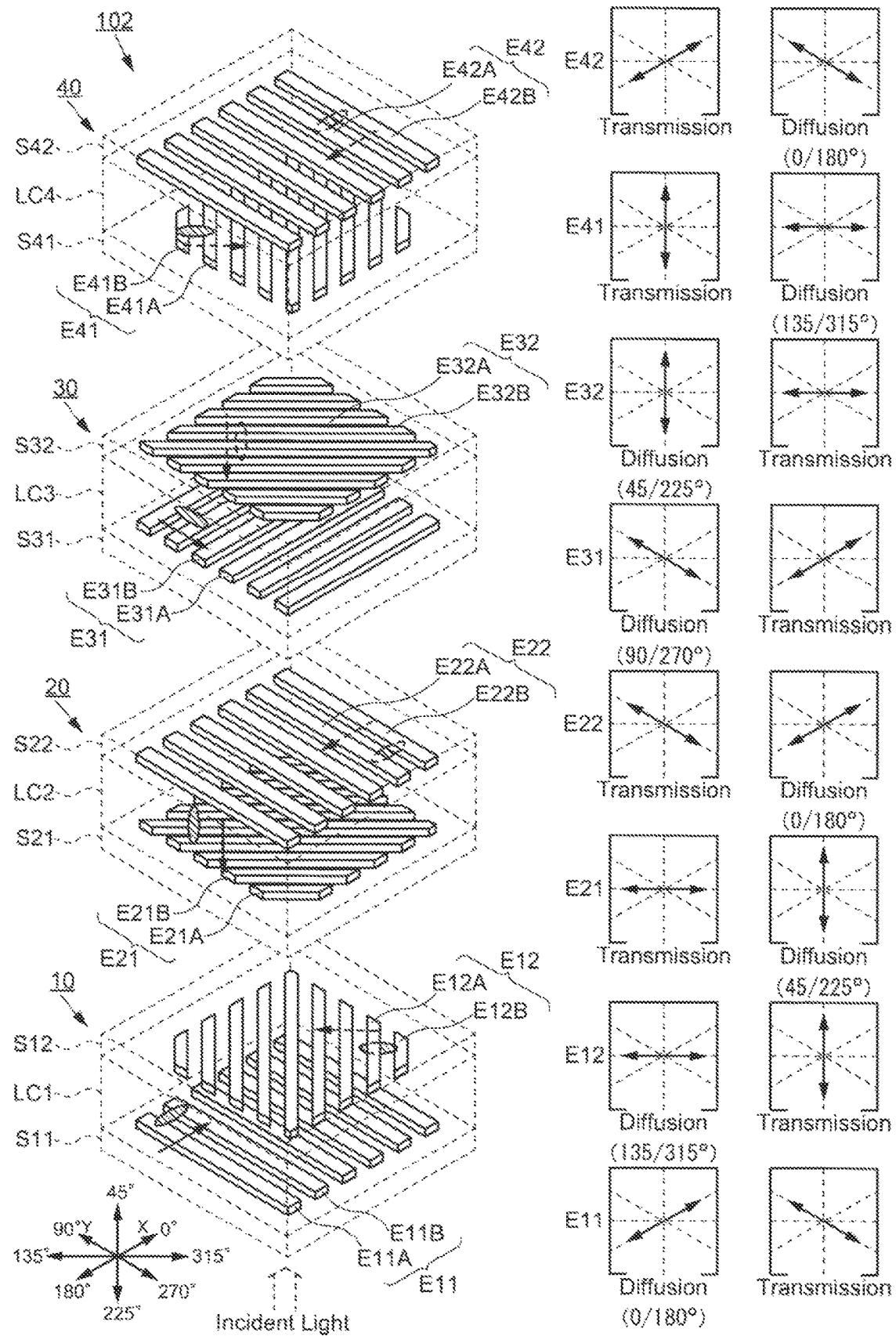
FIG. 10 shows a configuration and a diffusion state of a liquid crystal light control element according to an embodiment of the present invention.

FIG. 10 shows a relationship between an arrangement of the strip electrodes in each liquid crystal cell of the liquid crystal light control element 102 of the first embodiment and the polarized component to be diffused. The liquid crystal light control element 102 has a configuration in which the first liquid crystal cell 10, the second liquid crystal cell 20, the third liquid crystal cell 30, and the fourth liquid crystal cell 40 are stacked from the light incident side. FIG. shows the arrangement of electrodes, the alignment direction of alignment films, and the direction of the long axis of liquid crystal molecules for the first liquid crystal cell 10, the second liquid crystal cell 20, the third liquid crystal cell and the fourth liquid crystal cell 40 in the left-hand column, and the right-hand column shows the polarization directions of the first polarized component PL1 and the second polarized component PL2, as in FIG. 9, applied to the angles shown in the legend. Since the first polarization component PL1 and the second polarization component PL2, which are orthogonal to the first polarization component PL1 of the incident light, are optically rotated by the liquid crystal layer of each liquid crystal cell in the process of being incident on the first liquid crystal cell 10 to exiting from the fourth liquid crystal cell 40, the optical rotation states of the first polarization component PL1 and the second polarization component PL2 in each liquid crystal cell are indicated by arrows in the right column of FIG. 10. Such indications are the same for FIG. 11 through FIG. 14.

The arrangement of the first electrode and the arrangement of the second electrode of each liquid crystal cell are all different, in the liquid crystal light control element 102 according to first embodiment. Specifically, the longitudinal direction of the first strip electrode E11A and the second strip electrode E11B of the first liquid crystal cell 10 (also referred to as the "longitudinal direction of the first electrode E11" in the following description) is oriented in the direction of 90-270 degrees, and the third strip electrode E12A and the fourth strip electrode E12B (also referred to as the "longitudinal direction of the second electrode E12" in the following description) are oriented in the direction of 45-225 degrees. The alignment direction of the alignment film, which is not shown in the figure, is arranged in the direction that intersects the longitudinal direction of the strip electrode, so the alignment film on the first substrate S11 is in the direction of 0-180 degrees and the alignment film on the second substrate S12 is in the direction of 135-315 degrees. That is, the second electrode E12 is arranged to intersect the first electrode E11 at an angle in the range of 45 degrees±10 degrees (45 degrees in this embodiment), and the alignment direction of the alignment film is also arranged to intersect the first substrate S11 and the second substrate S12 at an angle of 45 degrees, in the first liquid crystal cell 10.

In the second liquid crystal cell 20, the longitudinal direction of the first electrode E21 is oriented in the direction of 135-315 degrees and the longitudinal direction of the second electrode E22 is oriented in the direction of 90-270 degrees, the alignment film on the first substrate S21 side is aligned in the direction of 45-225 degrees, and the alignment film on the second substrate S22 side is aligned in the direction of 0-180 degrees. In the third liquid crystal cell the longitudinal direction of the first electrode E31 is oriented in the direction of 0-180 degrees and the longitudinal direction of the second electrode E32 is oriented in the direction of 135-315 degrees, the alignment film on the first substrate S31 side is aligned in the direction of 90-270 degrees, and the alignment film on the second substrate S32 side is aligned in the direction of 45-225 degrees. In the fourth liquid crystal cell 40, the longitudinal direction of the first electrode E41 is oriented in the direction of 45-225 degrees and the longitudinal direction of the second electrode E42 is oriented in the direction of degrees, the alignment film on the first substrate S41 side is aligned in the direction of 135-315 degrees, and the alignment film on the second substrate S42 side is aligned in the direction of 0-180 degrees. The longitudinal direction of the second electrode E12 of the first liquid crystal cell 10 and the longitudinal direction of the first electrode E21 of the second liquid crystal cell 20, the longitudinal direction of the second electrode E22 of the second liquid crystal cell 20 and the longitudinal direction of the first electrode E31 of the third liquid crystal cell 30, and the longitudinal direction of the second electrode E32 of the third liquid crystal cell 30 and the longitudinal direction of the first electrode E41 of the fourth liquid crystal cell 40 intersect at an angle in the range of 90 degrees±10 degrees (90 degrees in this embodiment).

Next, the diffusion of light incident on each liquid crystal cell is explained. In the following explanation, it is assumed that a predetermined voltage is applied to the first electrode and second electrode of each liquid crystal cell, and a circular arc-shaped refractive index distribution is formed in the liquid crystal layer on the first substrate side and the second substrate side, respectively.

The longitudinal direction of the liquid crystal molecules closer to the first substrate S11 side of the first liquid crystal cell 10 is aligned in the direction of degrees, and the longitudinal direction of the liquid crystal molecules closer to the second substrate S12 side is aligned in the direction of 135-315 degrees. The parallel polarized component ($PL_{0/180}$) in the direction of 0-180 degrees of light incident from the first substrate S11 side is diffused in the direction of 0-180 degrees under the influence of the arc-shaped refractive index distribution of the first liquid crystal layer LC1, while the polarized component ($PL_{90/270}$) orthogonal to this component is transmitted. The polarized component ($PL_{0/180}$) is optically rotated 45 degrees clockwise by passing through the first liquid crystal layer LC1 from the first substrate S11 side to the second substrate S12 side to transform into the polarized component ($PL_{135/315}$) with the polarization axis in the direction of 135-315 degrees. Since the direction of the polarized component ($PL_{135/315}$) is the same as the alignment direction of the long axis of the liquid crystal molecules closer to the second substrate S12 side, it is diffused in the direction of 135-315 degrees again on the second substrate S12 side. On the other hand, the polarization component ($PL_{90/270}$) is optically rotated 45 degrees clockwise by the first liquid crystal layer LC1, resulting in the polarization component ($PL_{45/225}$) in which the direction of the polarization axis is in the direction of 45-225 degrees, and since this polarization component ($PL_{45/225}$) is in a relationship perpendicular to the orientation direction of the liquid crystal molecules closer to the second substrate S12 side, it is not diffused and passes through directly.

As described above, the parallel polarized component ($PL_{0/180}$) in the direction of 0-180 degrees of the light incident on the first liquid crystal cell 10 is diffused twice before and after the optical rotation, while the polarized component ($PL_{90/270}$) orthogonal to it is not diffused and only optically rotates and passes through the first liquid crystal cell 10.

This phenomenon of specific polarized components being diffused or transmitted occurs in the second liquid crystal cell 20, the third liquid crystal cell and the fourth liquid crystal cell 40. In the second liquid crystal cell 20, the polarized component ($PL_{45/225}$) in the direction of 45-225 degrees is diffused in the direction of 45-225 degrees and the direction of 0-180 degrees in the process of passing through the second liquid crystal cell 20, and the light incident as the polarized component ($P_{135/315}$) in the direction of 135-315 degrees passes through without being diffused. In the third liquid crystal cell 30, the polarized component ($PL_{90/270}$) in the direction of 90-270 degrees is diffused in the direction of 90-270 degrees and the direction of 45-225 degrees in the process of passing through the third liquid crystal cell 30, and the polarized component ($PL_{0/180}$) in the direction of 0-180 degrees is not diffused and passes through the third liquid crystal cell 30. In the fourth liquid crystal cell 40, the polarized component ($P_{135/315}$) in the direction of 135-315 degrees is diffused in the direction of 135-315 degrees and the direction of 90-270 degrees in the process of passing through the fourth liquid crystal cell 40, and the polarized component ($PL_{45/225}$) in the direction of 45-225 degrees is not diffused and passes through the fourth liquid crystal cell 40.

Although the liquid crystal light control element 102 of the first embodiment diffuses and optically rotates a specific polarized component in each liquid crystal cell and then diffuses again, focusing on the specific polarized component before entering the liquid crystal light control element 102, the polarized component is diffused twice when passing through one of the liquid crystal cells, it is not diffused by other liquid crystal cells. That is, the liquid crystal light control element 102 according to the first embodiment is assembled with electrodes so that a particular polarized component of the incident light is not diffused over the plurality of liquid crystal cells. According to the liquid crystal light control element 102 of the first embodiment, the same polarized component of the incident light is not diffused across different liquid crystal cells in the same direction, thereby preventing interference between liquid crystal cells and preventing the occurrence of moiré and uneven brightness (color unevenness).

Second Embodiment

Figure 11:
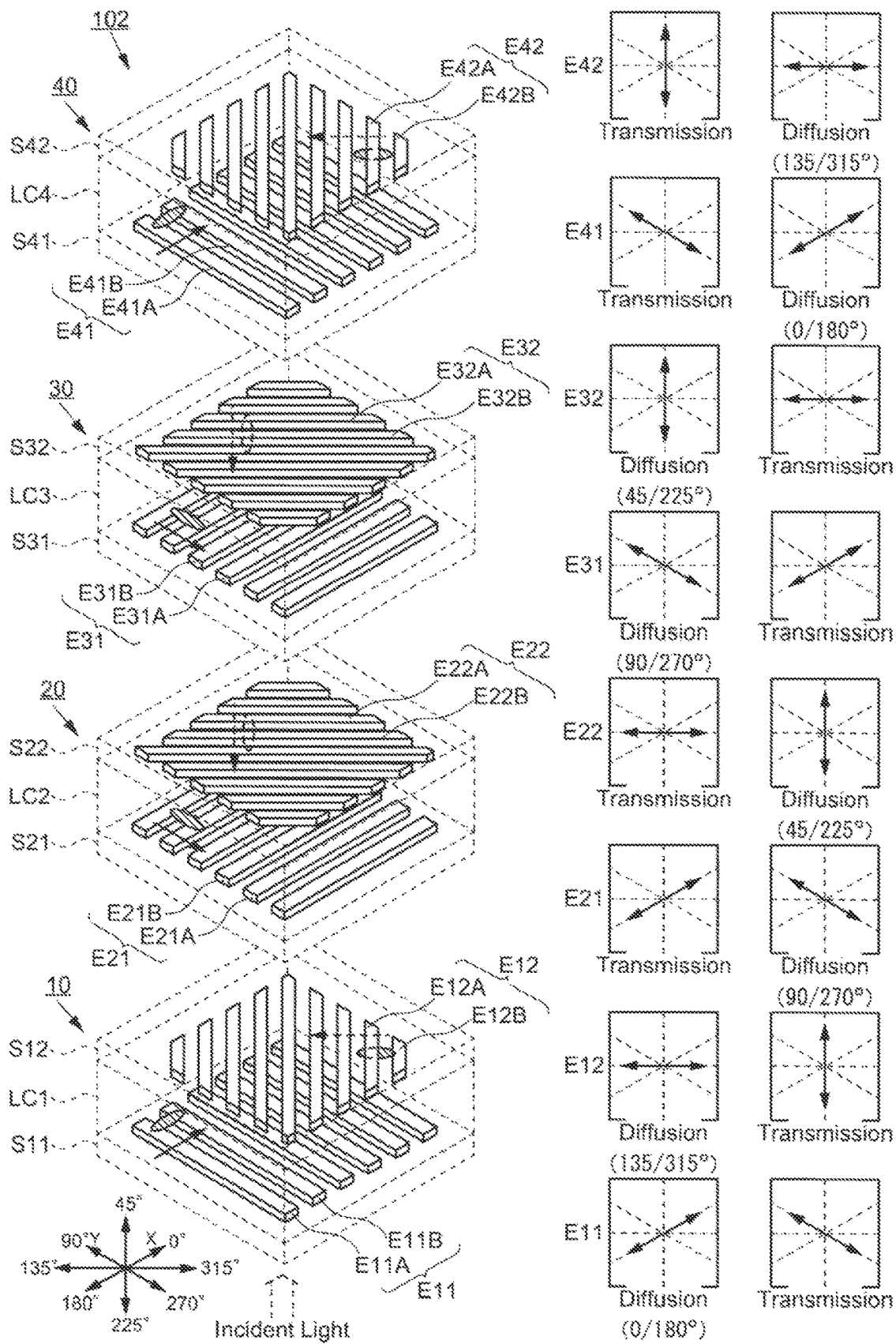
FIG. 11 shows a configuration and a diffusion state of a liquid crystal light control element according to an embodiment of the present invention.

FIG. 11 shows the relationship between the arrangement of the strip electrodes in each liquid crystal cell of the liquid crystal light control element 102 and the polarized component to be diffused, according to the second embodiment.

In the liquid crystal light control element 102 of the second embodiment, the electrode arrangement of the first liquid crystal cell 10 and the fourth liquid crystal cell 40 is the same, and the electrode arrangement of the second liquid crystal cell 20 and the third liquid crystal cell 30 is the same. Specifically, the longitudinal direction of the first electrode E11 of the first liquid crystal cell 10 is oriented in the direction of 90-180 degrees and the longitudinal direction of the second electrode E12 is oriented in the direction of 45-225 degrees. The same is true for the first electrode E41 and the second electrode E42 of the fourth liquid crystal cell 40. The alignment direction of the alignment film, which is not shown in the figure, is arranged in the direction that intersects the longitudinal direction of the strip electrode, so that the alignment direction of the alignment film on the first substrates S11, S41 are in the direction of 0-180 degrees, and the alignment direction of the alignment film on the second substrates S12, S42 are in the direction of 135-315 degrees.

The longitudinal direction of the first electrode E21 is oriented in the direction of 0-180 degrees and the longitudinal direction of the second electrode E22 is oriented in the direction of 135-315 degrees, in the second liquid crystal cell 20. The same is true for the first electrode E31 and second electrode E32 in the third liquid crystal cell 30. Since the alignment direction of the alignment film, which is not shown in the figure, is arranged in the direction that intersects the longitudinal direction of the strip electrodes, the alignment film of the first substrates S21, S31 are aligned in the direction of 90-270 degrees and the alignment film of the second substrates S22, S22 are aligned in the direction of 135-315 degrees.

Next, the diffusion of light incident on each liquid crystal cell is explained. In the following explanation, it is assumed that a predetermined voltage is applied to the first electrode and the second electrode of each liquid crystal cell, and the arc-like refractive index distribution is formed in the liquid crystal layer on the first substrate side and the second substrate side, respectively.

The configuration of the first liquid crystal cell 10 is the same as in the first embodiment, the parallel polarized component ($PL_{0/180}$) in the direction of 0-180 degrees is diffused once in the direction of 0-180 degrees and once in the direction of 135-315 degrees after the optical rotation, for a total of two times, and the orthogonal polarization component ($PL_{90/270}$) is not diffused, but only transmitted, in the light incident on the first liquid crystal cell 10. Focusing on the parallel polarized component ($PL_{0/180}$) in the direction of 0-180 degrees of the light incident on the first liquid crystal cell 10, this polarized component ($PL_{0/180}$) is optically rotated 45 degrees clockwise in the first liquid crystal cell 10 to transition to the polarized component ($PL_{135/315}$). This polarized component ($PL_{135/315}$) is further optically rotated 45 degrees clockwise in the second liquid crystal cell 20 and transitions to the polarized component ($PL_{90/270}$). This polarized component ($PL_{90/270}$) is diffused in the direction of 90-270 degrees since the long axis direction of the liquid crystal molecules closer to the first substrate S31 side of the third liquid crystal cell 30 is the same as the polarization axis. In addition, in the process of passing through from the first substrate S31 side to the second substrate S32 side, it is further optically rotated degrees clockwise by the third liquid crystal layer LC3, and transitions to the polarized component ($PL_{45/225}$). Since the direction of the polarization axis of the polarized component ($PL_{45/225}$) is the same as the alignment direction of the long axis of the liquid crystal molecules closer to the second substrate S32 side, it is diffused in the direction of 45-225 degrees again on the second substrate S12 side. This polarized component ($PL_{45/225}$) is optically rotated 45 degrees clockwise in the fourth liquid crystal cell 40 and transitions to the polarized component ($PL_{0/180}$), but is not diffused in the fourth liquid crystal cell 40.

The polarized component ($PL_{90/270}$) that passes through the first liquid crystal cell is diffused in the direction of 90-270 degrees on the first electrode E21 side in the second liquid crystal cell 20. This polarized component ($PL_{90/270}$) is optically rotated 45 degrees clockwise by passing through the first substrate S21 side to the second substrate S22, and transitions to the polarized component ($PL_{45/225}$). The polarized component ($PL_{45/225}$) is diffused in the direction of 45-225 degrees since the polarized component ($PL_{45/225}$) has the same polarization axis as the long axis direction of the liquid crystal molecules closer to the second substrate S22 side of the second liquid crystal cell 20. This polarized component ($PL_{45/225}$) is optically rotated 45 degrees clockwise in the third liquid crystal cell 30 and transitions to the polarized component ($PL_{0/180}$). The polarized component ($PL_{0/180}$) is diffused in the direction of 0-180 degrees since the polarization axis is the same as the long axis direction of the liquid crystal molecules closer to the first substrate S41 side of the fourth liquid crystal cell 40. Then, it is optically rotated 45 degrees clockwise by the fourth liquid crystal layer LC4 and transitions to the polarized component ($PL_{135/315}$), in the process of passing through the first substrate S41 side to the second substrate S42 side. Since the direction of the polarized component ($PL_{135/315}$) is the same as the alignment direction of the long axis of the liquid crystal molecules closer to the second substrate S42 side, it is diffused in 135-315 direction again on the second substrate S42 side.

As described above, in the liquid crystal light control element 102 of the second embodiment, the polarized component diffused twice in the first liquid crystal cell 10 is diffused twice again in the third liquid crystal cell 30, but the diffusion directions are all different. The polarized component diffused twice in the second liquid crystal cell 20 is diffused twice again in the fourth liquid crystal cell 40, but the diffusion directions are all different. Although the liquid crystal light control element 102 of the second embodiment can diffuse a specific polarized component of the incident light a total of four times in two liquid crystal cells, since the directions of diffusion are all different, it is possible to prevent interference between the liquid crystal cells, thereby preventing the occurrence of moiré and non-uniformity of luminance (color irregularity).

Third Embodiment

Figure 12:
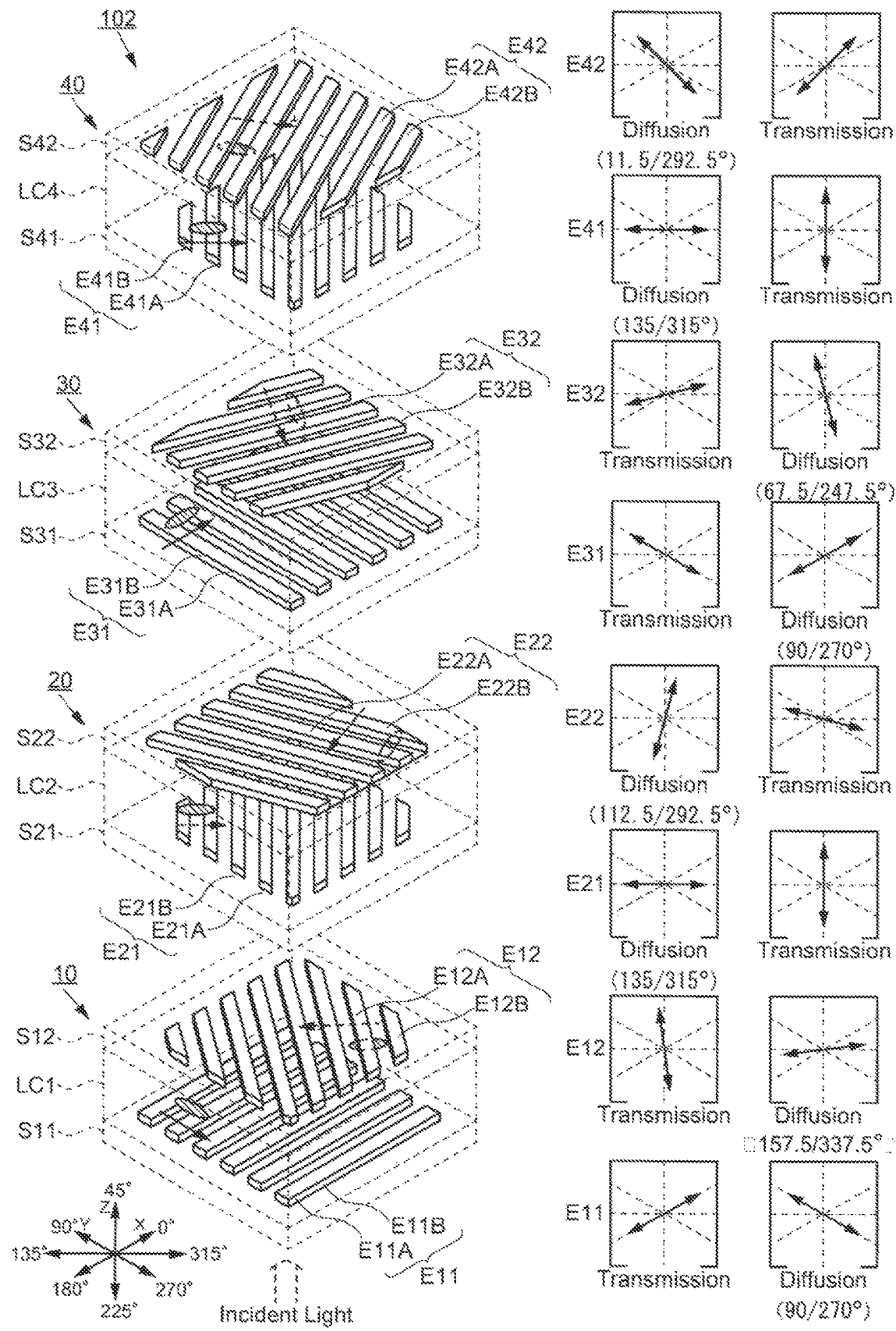
FIG. 12 shows a configuration and a diffusion state of a liquid crystal light control element according to an embodiment of the present invention.

FIG. 12 shows a relationship between an arrangement of the strip electrodes in each liquid crystal cell of the liquid crystal light control element 102 and the polarized component to be diffused, according to the third embodiment.

The liquid crystal light control element 102 in this embodiment includes four liquid crystal cells, each of which includes a first electrode and a second electrode intersecting at an angle in the range of 67.5 degrees±10 degrees. In FIG. 12, for simplicity, each liquid crystal cell is assumed to have the first electrode and the second electrode crossed at 67.5 degrees. For example, when the first electrode E11 of the first liquid crystal cell 10 is arranged in the direction of 0-180 degrees, the second electrode E12 is arranged in the direction of 67.5-247.5 degrees, when the first electrode E21 of the second liquid crystal cell 20 is arranged in the direction of 45-225 degrees, the second electrode E22 is arranged in the direction of 112.5-292.5 degrees, when the first electrode E31 of the third liquid crystal cell 30 is arranged in the direction of 90-270 degrees, the second electrode E32 is arranged in the direction of 157.5-337.5 degrees, when the first electrode E41 of the fourth liquid crystal cell 40 is arranged in the direction of 135-315.5 degrees, the second electrode E42 is arranged in the direction of 22.5-202.5 degrees. The second liquid crystal cell 20 is in a 45 degrees rotated relationship to the first liquid crystal cell 10, and the third liquid crystal cell 30 and the fourth liquid crystal cell 40 are also in a 45 degrees rotated relationship. This arrangement of electrodes may be achieved by rotating the panel when assembling the liquid crystal light control element 102, or by rotating the photomask or substrate when fabricating the electrodes and performing the photolithography process.

Thus, since all electrodes of all the liquid crystal cells are arranged differently, it is possible to prevent interference between liquid crystal cells and prevent the occurrence of moiré and non-uniformity of luminance (color irregularity). In addition, it can be diffused in 8 directions in the direction of 0-180 degrees, the direction of 22.5-202.5 degrees, the direction of 45-225 degrees, the direction of 67.5-247.5 degrees, and the direction of 90-180 degrees, for a more uniform light distribution.

Fourth Embodiment

Figure 13:
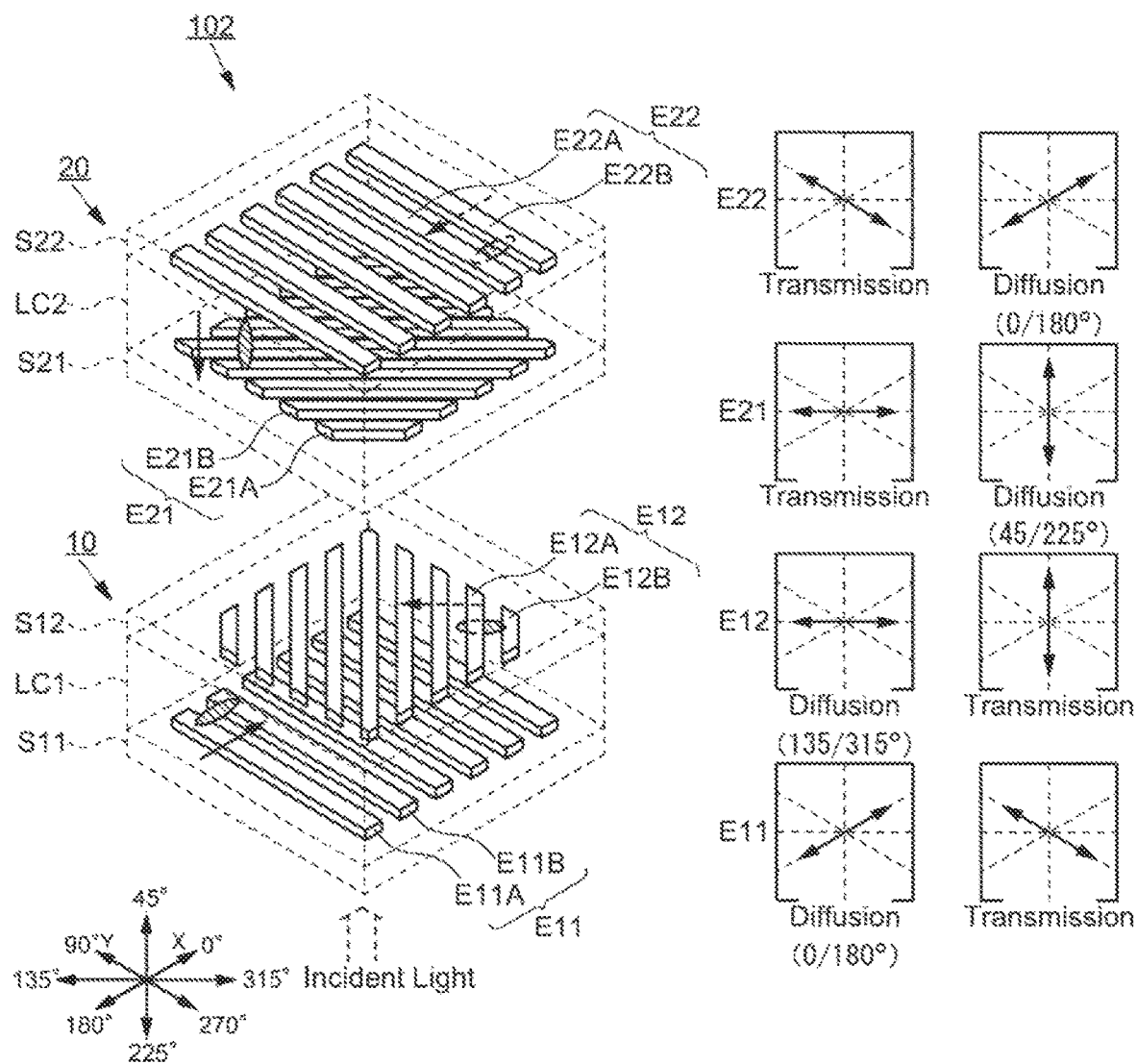
FIG. 13 shows a configuration and a diffusion state of a liquid crystal light control element according to an embodiment of the present invention.

FIG. 13 shows a relationship between an arrangement of the strip electrodes in each liquid crystal cell of the liquid crystal light control element 102 and the polarized component to be diffused, according to the fourth embodiment. The liquid crystal light control element 102 according to the fourth embodiment is configured with two liquid crystal cells, the first liquid crystal cell 10 and the second liquid crystal cell 20.

As shown in FIG. 13, the first electrode E11 and the second electrode E12 of the first liquid crystal cell 10 and the first electrode E21 and the second electrode E22 of the second liquid crystal cell 20 intersect at an angle in the range of 45 degrees±10 degrees. The first electrode E11 of the first liquid crystal cell 10 and the first electrode E21 of the second liquid crystal cell 20, and the second electrode E12 of the first liquid crystal cell 10 and the second electrode E22 of the second liquid crystal cell 20 intersect at an angle in the range of 90 degrees±10 degrees.

As explained in the first embodiment, this configuration allows two orthogonal polarized components to be diffused in the two liquid crystal cells, the first liquid crystal cell 10 and the second liquid crystal cell 20. Furthermore, the first electrodes E11 and E21 and the second electrodes E12 and E22 of the first liquid crystal cell 10 and the second liquid crystal cell 20 all have different electrode directions, which prevents moiré from occurring since there is no interference in light diffusion between the electrodes.

Figure 14:
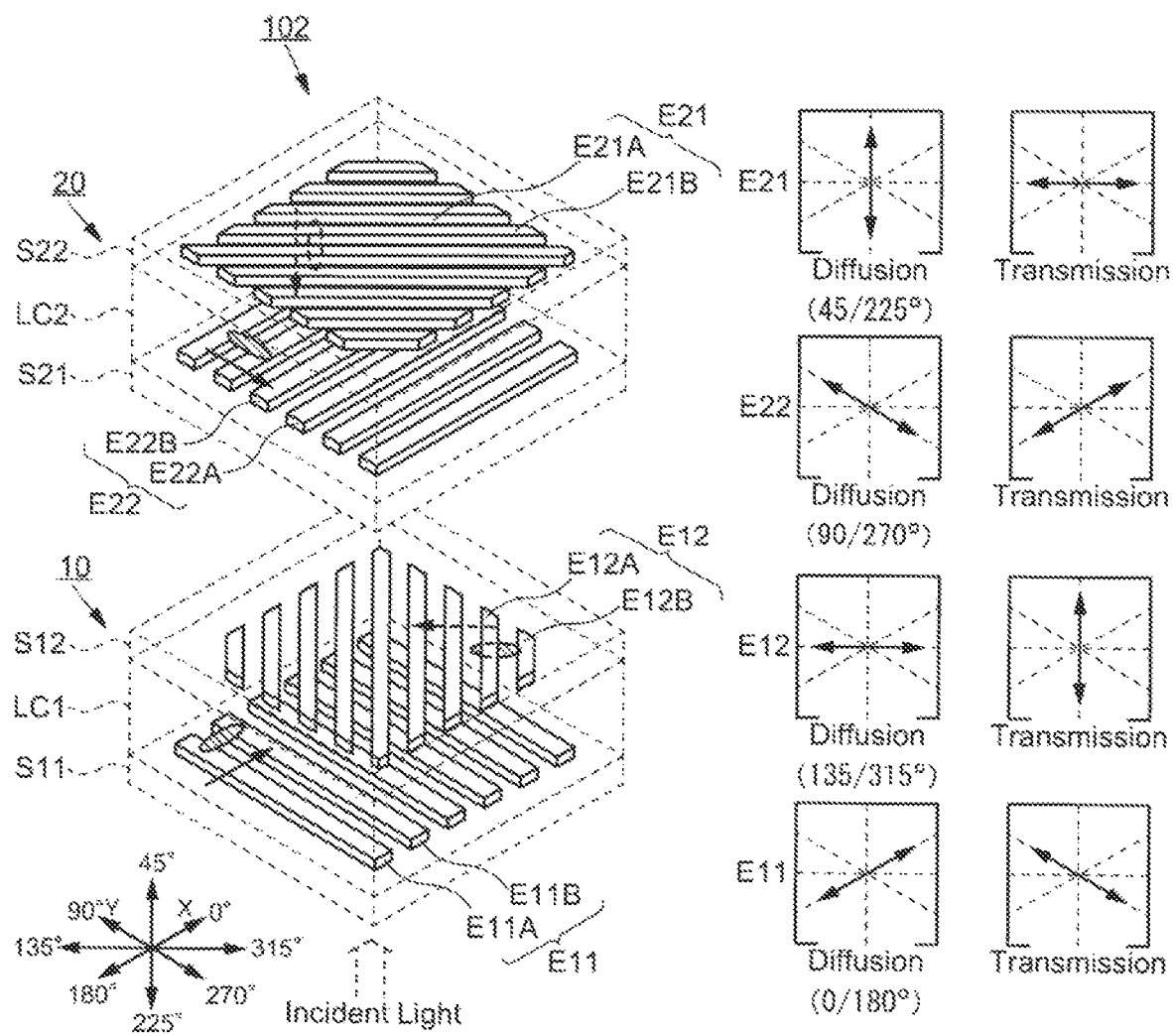
FIG. 14 shows a configuration and a diffusion state of a liquid crystal light control element according to an embodiment of the present invention.

FIG. 14 shows an aspect of the second liquid crystal cell 20 in which it is inverted. Focusing only on the electrode arrangement, it can be expressed that the first electrode E21 and the second electrode E22 of the second liquid crystal cell 20 are rotated 45 degrees with respect to the electrode arrangement in FIG. 13. This arrangement also allows two orthogonal polarized components to be diffused in the two liquid crystal cells, preventing interference between the electrodes, and preventing moiré from occurring.

As explained above by the first through fourth embodiments, the liquid crystal cells configuring the liquid crystal light control element 102 are arranged so that the two electrodes in a cell intersect at an angle in the range of 45 degrees±10 degrees (or 22.5 degrees±10 degrees), and since the electrode configuration is not the same even between adjacent cells, it is possible to prevent the occurrence of moiré and eliminate non-uniformity in luminance.

The configuration of the liquid crystal light control element 102 illustrated in the first through fourth embodiments is an example, and the order of the liquid crystal cells and the arrangement of the electrodes can be arranged as needed without departing from the gist of the present invention. The number of liquid crystal cells is not limited to a combination of two cells or four cells, and more cells can be combined.

What is claimed is:

1. A liquid crystal light control device, comprising:
    a first liquid crystal cell;
    a second liquid crystal cell overlapping the first liquid crystal cell;
    a third liquid crystal cell overlapping the second liquid crystal cell; and
    a fourth liquid crystal cell overlapping the third liquid crystal cell,
    each of the first liquid crystal cell, the second liquid crystal cell, the third liquid crystal cell, and the fourth liquid crystal cell, including:
        a first substrate arranged with a first electrode having a strip pattern;
        a second substrate arranged with a second electrode having a strip pattern; and
        a liquid crystal layer between the first substrate and the second substrate,
    wherein a longitudinal direction of the strip pattern of the first electrode and a longitudinal direction of the strip pattern of the second electrode are arranged to intersect at an angle in the range of 67.5 degrees±10 degrees.

2. The liquid crystal light control device according to claim 1, wherein:
    a longitudinal direction of the strip pattern of the first electrode of the first liquid crystal cell, the second liquid crystal cell, the third liquid crystal cell, and the fourth liquid crystal cell are different; and
    a longitudinal direction of the strip pattern of the second electrode of the first liquid crystal cell, the second liquid crystal cell, the third liquid crystal cell, and the fourth liquid crystal cell are different.

3. The liquid crystal light control device according to claim 1, wherein:
    the strip pattern of the second electrode of the first liquid crystal cell and the strip pattern of the first electrode of the second liquid crystal cell intersect at an angle in the range of 90 degrees±10 degrees;
    the strip pattern of the second electrode of the second liquid crystal cell and the strip pattern of the first electrode of the third liquid crystal cell intersect at an angle in the range of 90 degrees±10 degrees; and the strip pattern of the second electrode of the third liquid crystal cell and the strip pattern of the first electrode of the fourth liquid crystal cell intersect at an angle in the range of 90 degrees±10 degrees.

4. The liquid crystal light control device according to claim 1, wherein:

the strip pattern of the first electrode and the strip pattern of the second electrode of the first liquid crystal cell and the fourth liquid crystal cell are arranged in the same direction; and the strip pattern of the first electrode and the strip pattern of the second electrode of the second liquid crystal cell and the third liquid crystal cell are arranged in the same direction.

* * * * *